United States Patent
Kim et al.

(10) Patent No.: US 8,211,976 B2
(45) Date of Patent: Jul. 3, 2012

(54) SPORTS EQUIPMENT COMPOSITIONS COMPRISING A POLYURETHANE, POLYUREA OR PREPOLYMER THEREOF AND A POLYFUNCTIONAL MODIFIER

(75) Inventors: Hyun J. Kim, Carlsbad, CA (US); Hong G. Jeon, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 750 days.

(21) Appl. No.: 12/336,296

(22) Filed: Dec. 16, 2008

(65) Prior Publication Data

US 2009/0163298 A1 Jun. 25, 2009

Related U.S. Application Data

(60) Provisional application No. 61/016,328, filed on Dec. 21, 2007.

(51) Int. Cl.
*A63B 37/00* (2006.01)
*A63B 37/12* (2006.01)
*C08L 75/00* (2006.01)
*C08G 18/34* (2006.01)

(52) U.S. Cl. ....... 525/54.3; 525/452; 525/453; 525/454; 527/301; 528/45; 528/60; 528/71; 528/73; 473/371; 473/374; 473/376; 473/378

(58) Field of Classification Search .................. None
See application file for complete search history.

(56) References Cited

U.S. PATENT DOCUMENTS

| | | | |
|---|---|---|---|
| 3,264,272 A | 8/1966 | Rees et al. | |
| 3,265,272 A | 8/1966 | Smith | |
| 3,359,231 A | 12/1967 | George | |
| 3,388,186 A | 6/1968 | Kray et al. | |
| 3,454,280 A | 7/1969 | Harrison et al. | |
| 3,465,059 A | 9/1969 | Seven et al. | |
| 3,492,245 A | 1/1970 | Calderon et al. | |
| 3,528,936 A | 9/1970 | Kent et al. | |
| 3,560,573 A | 2/1971 | Hayden et al. | |
| 3,634,543 A | 1/1972 | Sherman | |
| 3,726,835 A | 4/1973 | Bertozzi | |
| 3,804,803 A | 4/1974 | Streck et al. | |
| 3,819,768 A | 6/1974 | Molitor | |
| 3,974,092 A | 8/1976 | Streck et al. | |
| 3,974,238 A | 8/1976 | Schweiker et al. | |
| 3,989,568 A | 11/1976 | Isaac | |
| 4,035,438 A | 7/1977 | Nielinger et al. | |
| 4,104,216 A | 8/1978 | Clampitt | |
| 4,115,475 A | 9/1978 | Foy et al. | |
| 4,123,061 A | 10/1978 | Dusbiber | |
| 4,153,772 A | 5/1979 | Schwesig et al. | |
| 4,183,876 A | 1/1980 | Coran et al. | |
| 4,195,015 A | 3/1980 | Deleens et al. | |
| 4,217,430 A | 8/1980 | Starkweather et al. | |
| 4,230,828 A | 10/1980 | Caul, Jr. et al. | |
| 4,230,838 A | 10/1980 | Foy et al. | |
| 4,248,432 A | 2/1981 | Hewitt et al. | |
| 4,331,786 A | 5/1982 | Foy et al. | |
| 4,332,920 A | 6/1982 | Foy et al. | |
| 4,349,657 A | 9/1982 | Halloway | |
| 4,404,325 A | 9/1983 | Mason et al. | |
| 4,431,193 A | 2/1984 | Nesbitt | |
| 4,482,663 A | 11/1984 | Kraus | |
| 4,546,980 A | 10/1985 | Gendreau et al. | |
| 4,611,810 A | 9/1986 | Kamata et al. | |
| 4,692,497 A | 9/1987 | Gendreau et al. | |
| 4,726,590 A | 2/1988 | Molitor | |
| 4,728,693 A | 3/1988 | Dröscher et al. | |
| 4,755,552 A | 7/1988 | Jadamus et al. | |
| 4,762,322 A | 8/1988 | Molitor et al. | |
| 4,781,383 A | 11/1988 | Kamada et al. | |
| 4,792,141 A | 12/1988 | Llort | |
| 4,798,386 A | 1/1989 | Berard | |
| 4,838,556 A | 6/1989 | Sullivan | |
| 4,839,441 A | 6/1989 | Cuzin et al. | |
| 4,840,993 A | 6/1989 | Bartz | |
| 4,844,471 A | 7/1989 | Terence et al. | |
| 4,852,884 A | 8/1989 | Sullivan | |
| 4,864,014 A | 9/1989 | Cuzin et al. | |
| 4,865,326 A | 9/1989 | Isaac et al. | |
| 4,884,814 A | 12/1989 | Sullivan | |
| 4,894,411 A | 1/1990 | Okada et al. | |
| 4,950,826 A | 8/1990 | Zerpner et al. | |

(Continued)

FOREIGN PATENT DOCUMENTS

EP 0 342 244 11/1989

(Continued)

OTHER PUBLICATIONS

Akrochem Proaid AC 18E product literature (no date).
DeStefani, "Small but Mighty," *Molding Systems* 3:34-46, Oct. 1999.
DuPont Packaging & Industrial Polymers, DuPont™ Surlyn® 8150 Data Sheet (3 pages), E.I. DuPont De Nemours and Company, Inc., Mar. 2004.
DuPont Packaging & Industrial Polymers, DuPont™ Surlyn® 9150 Data Sheet (3 pages), E.I. DuPont De Nemours and Company, Inc., Mar. 2004.
DuPont Product Literature for HPF1000, May 2005.
DuPont Product Literature for HPF2000, May 2005.
DuPont™ Surlyn® molding resins for golf ball manufacturing, Golf Ball Resins, http://www2.dupont.com/Surlyn/en_US/products/golfball_resins.html, downloaded Dec. 27, 2007.
*Encyclopedia of Chemical Technology* 6:415-418, 1993.
*Encyclopedia of Polymer Science and Engineering* 7:54-55, 1988.
*Hawley's Condensed Chemical Dictionary*, 13th edition, pp. 206, 828, 2001.

(Continued)

*Primary Examiner* — David Buttner

(74) *Attorney, Agent, or Firm* — Klarquist Sparkman, LLP

(57) ABSTRACT

Embodiments of a composition useful for making sports equipment, such as golf balls, are disclosed comprising at least one polyurethane, polyurea, polymer precursor composition thereof, blocked polyurethane, blocked polyurea or blocked polymer precursor composition thereof, and an effective amount of a polyfunctional modifier. One disclosed embodiment of a method for forming a golf ball comprises providing a first composition comprising at least one polyurethane, polyurea, polymer precursor composition thereof, blocked polyurethane, blocked polyurea or blocked polymer precursor composition thereof, and an effective amount of a polyfunctional modifier. The first composition is combined with at least a second composition to make at least one component of a golf ball.

24 Claims, 4 Drawing Sheets

U.S. PATENT DOCUMENTS

| | | | |
|---|---|---|---|
| 4,955,966 A | 9/1990 | Yuki |
| 4,998,734 A | 3/1991 | Meyer |
| 5,007,647 A | 4/1991 | Gulick |
| 5,064,199 A | 11/1991 | Morell |
| 5,130,372 A | 7/1992 | Lences et al. |
| 5,150,905 A | 9/1992 | Yuki et al. |
| 5,228,697 A | 7/1993 | Gulick et al. |
| 5,252,652 A | 10/1993 | Egashira et al. |
| 5,253,871 A | 10/1993 | Viollaz |
| 5,301,951 A | 4/1994 | Morell |
| 5,306,760 A | 4/1994 | Sullivan |
| 5,312,857 A | 5/1994 | Sullivan |
| 5,324,783 A | 6/1994 | Sullivan |
| 5,330,195 A | 7/1994 | Gulick |
| 5,334,673 A | 8/1994 | Wu |
| 5,384,385 A | 1/1995 | Trinks et al. |
| 5,385,776 A | 1/1995 | Maxfield et al. |
| 5,424,006 A | 6/1995 | Murayama et al. |
| 5,436,295 A | 7/1995 | Nishikawa et al. |
| 5,460,367 A | 10/1995 | Horiuchi |
| 5,484,870 A | 1/1996 | Wu |
| 5,496,035 A | 3/1996 | Gilchrist et al. |
| 5,542,680 A | 8/1996 | Proudfit et al. |
| 5,609,535 A | 3/1997 | Morgan |
| 5,651,741 A | 7/1997 | Masutani et al. |
| 5,688,869 A | 11/1997 | Sullivan |
| 5,691,066 A | 11/1997 | Rajagopalan |
| 5,692,974 A | 12/1997 | Wu et al. |
| 5,733,205 A | 3/1998 | Higuchi et al. |
| 5,766,097 A | 6/1998 | Horiuchi et al. |
| 5,776,012 A | 7/1998 | Moriyama et al. |
| 5,779,561 A | 7/1998 | Sullivan et al. |
| 5,789,475 A | 8/1998 | Chen |
| 5,810,677 A | 9/1998 | Maruko et al. |
| 5,810,678 A | 9/1998 | Cavallaro et al. |
| 5,816,943 A | 10/1998 | Masutani et al. |
| 5,833,553 A | 11/1998 | Sullivan et al. |
| 5,886,103 A | 3/1999 | Bellinger et al. |
| 5,948,862 A | 9/1999 | Sano et al. |
| 5,959,059 A | 9/1999 | Vedula et al. |
| 5,962,533 A | 10/1999 | Bergeron, Jr. |
| 5,962,553 A | 10/1999 | Ellsworth |
| 5,973,046 A | 10/1999 | Chen et al. |
| 5,985,370 A | 11/1999 | Ohira et al. |
| 5,989,135 A | 11/1999 | Welch |
| 5,989,136 A | 11/1999 | Renard et al. |
| 6,012,991 A | 1/2000 | Kim et al. |
| 6,012,992 A | 1/2000 | Yavitz |
| 6,037,419 A | 3/2000 | Takesue et al. |
| 6,042,489 A | 3/2000 | Renard et al. |
| 6,060,549 A | 5/2000 | Li et al. |
| 6,068,561 A | 5/2000 | Renard et al. |
| 6,083,119 A | 7/2000 | Sullivan et al. |
| 6,100,321 A | 8/2000 | Chen |
| 6,117,024 A | 9/2000 | Dewanjee |
| 6,117,025 A | 9/2000 | Sullivan |
| 6,142,887 A | 11/2000 | Sullivan et al. |
| 6,162,135 A | 12/2000 | Bulpett et al. |
| 6,180,722 B1 | 1/2001 | Dalton et al. |
| 6,183,382 B1 | 2/2001 | Kim et al. |
| 6,193,617 B1 | 2/2001 | Mertens |
| 6,203,451 B1 | 3/2001 | Rajagopalan |
| 6,255,361 B1 | 7/2001 | Rajagopalan et al. |
| 6,309,706 B2 | 10/2001 | Maruoka et al. |
| 6,315,681 B1 | 11/2001 | Sullivan |
| 6,329,458 B1 | 12/2001 | Takesue et al. |
| 6,361,455 B1 | 3/2002 | Takemura |
| 6,368,237 B1 | 4/2002 | Sullivan |
| 6,416,424 B2 | 7/2002 | Sullivan |
| 6,419,594 B1 | 7/2002 | Nesbitt et al. |
| 6,426,387 B1 | 7/2002 | Kim |
| 6,435,986 B1 | 8/2002 | Wu et al. |
| 6,454,666 B1 | 9/2002 | Shira |
| 6,462,303 B1 | 10/2002 | Brown |
| 6,476,176 B1 | 11/2002 | Wu |
| 6,485,378 B1 | 11/2002 | Boehm |
| 6,503,156 B1 | 1/2003 | Sullivan |
| 6,506,130 B2 | 1/2003 | Sullivan |
| 6,508,724 B2 | 1/2003 | Dalton |
| 6,508,725 B1 | 1/2003 | Kim |
| 6,520,871 B1 | 2/2003 | Sullivan et al. |
| 6,525,157 B2 | 2/2003 | Cozewith et al. |
| 6,537,158 B2 | 3/2003 | Watanabe |
| 6,558,277 B1 | 5/2003 | Ohira et al. |
| 6,562,906 B2 | 5/2003 | Chen |
| 6,569,037 B2 | 5/2003 | Ichikawa et al. |
| 6,582,326 B2 | 6/2003 | Wu et al. |
| 6,592,472 B2 | 7/2003 | Dewanjee |
| 6,610,812 B1 | 8/2003 | Wu et al. |
| 6,616,552 B2 | 9/2003 | Takesue et al. |
| 6,635,715 B1 | 10/2003 | Datta et al. |
| 6,635,716 B2 | 10/2003 | Voorheis et al. |
| 6,639,024 B2 | 10/2003 | Simonds et al. |
| 6,642,316 B1 | 11/2003 | Datta et al. |
| 6,649,678 B1 | 11/2003 | Sandstrom |
| 6,653,382 B1 | 11/2003 | Statz et al. |
| 6,653,403 B2 | 11/2003 | Dalton et al. |
| 6,692,379 B2 | 2/2004 | Morgan et al. |
| 6,695,718 B2 | 2/2004 | Nesbitt |
| 6,719,646 B2 | 4/2004 | Calabria et al. |
| 6,762,244 B2 | 7/2004 | Rajagopalan et al. |
| 6,762,273 B2 | 7/2004 | Dewanjee |
| 6,770,360 B2 | 8/2004 | Mientus et al. |
| 6,776,942 B2 | 8/2004 | Kim |
| 6,777,472 B1 | 8/2004 | Statz et al. |
| 6,780,126 B2 | 8/2004 | Ladd et al. |
| 6,780,127 B2 | 8/2004 | Kennedy, III |
| 6,793,864 B1 | 9/2004 | Dewanjee et al. |
| 6,794,447 B1 | 9/2004 | Kim et al. |
| 6,812,276 B2 | 11/2004 | Yeager |
| 6,815,480 B2 | 11/2004 | Statz et al. |
| 6,835,146 B2 | 12/2004 | Jordan et al. |
| 6,852,784 B2 | 2/2005 | Sullivan |
| 6,861,474 B2 | 3/2005 | Kim |
| 6,878,075 B2 | 4/2005 | Kim |
| 6,894,098 B2 | 5/2005 | Rajagopalan et al. |
| 6,903,178 B2 | 6/2005 | Wu et al. |
| 6,905,423 B2 | 6/2005 | Morgan et al. |
| 6,919,395 B2 | 7/2005 | Rajagopalan et al. |
| 6,924,337 B2 | 8/2005 | Kim et al. |
| 6,930,150 B2 | 8/2005 | Kim |
| 6,939,924 B2 | 9/2005 | Kim et al. |
| 6,943,213 B2 * | 9/2005 | Kuntimaddi .................. 525/127 |
| 6,949,595 B2 | 9/2005 | Morgan et al. |
| 6,951,519 B2 | 10/2005 | Dewanjee et al. |
| 6,960,629 B2 | 11/2005 | Voorheis et al. |
| 6,962,951 B1 | 11/2005 | Takesue et al. |
| 6,974,854 B2 | 12/2005 | Dewanjee |
| 7,001,286 B2 | 2/2006 | Kim et al. |
| 7,026,399 B2 | 4/2006 | Kim et al. |
| 7,037,985 B2 | 5/2006 | Kim et al. |
| 7,041,769 B2 | 5/2006 | Wu et al. |
| 7,070,518 B2 | 7/2006 | Kennedy, III |
| 7,163,471 B2 | 1/2007 | Kim et al. |
| 7,169,861 B2 | 1/2007 | Kim et al. |
| 7,182,703 B2 | 2/2007 | Emerson et al. |
| 7,208,546 B2 | 4/2007 | Rajagopalan et al. |
| 7,226,961 B2 | 6/2007 | Park et al. |
| 7,230,127 B2 | 6/2007 | Sage et al. |
| 7,242,443 B2 | 7/2007 | Sage et al. |
| 7,261,647 B2 | 8/2007 | Sullivan et al. |
| 7,265,195 B2 | 9/2007 | Kuntimaddi et al. |
| 7,276,570 B2 | 10/2007 | Kuntimaddi et al. |
| 7,314,896 B2 | 1/2008 | Rajagopalan et al. |
| 7,332,533 B2 | 2/2008 | Kim et al. |
| 7,378,483 B2 | 5/2008 | Wu et al. |
| 7,462,113 B2 | 12/2008 | Kim et al. |
| 7,491,136 B2 | 2/2009 | Deng et al. |
| 7,528,196 B2 | 5/2009 | Kim et al. |
| 7,534,838 B2 | 5/2009 | Kim et al. |
| 7,687,116 B2 | 3/2010 | Kim et al. |
| 7,767,759 B2 | 8/2010 | Kim |
| 7,874,940 B2 | 1/2011 | Kim et al. |
| 7,878,926 B2 | 2/2011 | Kim et al. |
| 2001/0005699 A1 | 6/2001 | Morgan et al. |
| 2001/0019971 A1 | 9/2001 | Hayashi et al. |
| 2001/0031669 A1 | 10/2001 | Ohama |

| | | | |
|---|---|---|---|
| 2001/0034398 A1* | 10/2001 | Ohira et al. .................... 524/500 |
| 2001/0046906 A1 | 11/2001 | Rajagopalan et al. |
| 2002/0040111 A1 | 4/2002 | Rajagopalan |
| 2002/0045499 A1 | 4/2002 | Takemura et al. |
| 2002/0049099 A1 | 4/2002 | Peter |
| 2002/0061792 A1 | 5/2002 | Yagley et al. |
| 2002/0065149 A1 | 5/2002 | Tzivanis et al. |
| 2002/0193181 A1 | 12/2002 | Kennedy et al. |
| 2003/0008975 A1 | 1/2003 | Takesue et al. |
| 2003/0012902 A1 | 1/2003 | Kim et al. |
| 2003/0017888 A1 | 1/2003 | Higuchi et al. |
| 2003/0050373 A1 | 3/2003 | Chen |
| 2003/0060307 A1 | 3/2003 | Umezawa et al. |
| 2003/0064826 A1 | 4/2003 | Voorheis et al. |
| 2003/0069087 A1 | 4/2003 | Ichikawa et al. |
| 2003/0078348 A1 | 4/2003 | Rajagopalan et al. |
| 2003/0096661 A1 | 5/2003 | Kim |
| 2003/0119989 A1 | 6/2003 | Ladd et al. |
| 2003/0130066 A1 | 7/2003 | Saski |
| 2003/0153716 A1* | 8/2003 | Wu et al. .................... 528/60 |
| 2003/0158312 A1 | 8/2003 | Chen |
| 2003/0199662 A1* | 10/2003 | Risen et al. .................... 528/44 |
| 2003/0224871 A1 | 12/2003 | Kim et al. |
| 2003/0228937 A1 | 12/2003 | Dewanjee |
| 2003/0229183 A1 | 12/2003 | Voorheis et al. |
| 2004/0019138 A1 | 1/2004 | Voorheis et al. |
| 2004/0044136 A1 | 3/2004 | Kim et al. |
| 2004/0059062 A1 | 3/2004 | Kim |
| 2004/0082408 A1 | 4/2004 | Sullivan et al. |
| 2004/0092336 A1 | 5/2004 | Kim et al. |
| 2004/0097653 A1 | 5/2004 | Kim et al. |
| 2004/0106474 A1 | 6/2004 | Hayashi et al. |
| 2004/0161623 A1 | 8/2004 | Domine et al. |
| 2004/0176185 A1 | 9/2004 | Morgan et al. |
| 2004/0176188 A1 | 9/2004 | Morgan et al. |
| 2004/0180733 A1 | 9/2004 | Kim |
| 2004/0201133 A1 | 10/2004 | Dewanjee et al. |
| 2004/0209708 A1 | 10/2004 | Bulpett et al. |
| 2004/0230005 A1 | 11/2004 | Voorheis et al. |
| 2004/0230006 A1 | 11/2004 | Voorheis et al. |
| 2004/0230007 A1 | 11/2004 | Voorheis et al. |
| 2004/0233347 A1 | 11/2004 | Sage et al. |
| 2004/0235584 A1 | 11/2004 | Chao et al. |
| 2004/0236030 A1 | 11/2004 | Kim et al. |
| 2004/0245503 A1 | 12/2004 | Sage et al. |
| 2004/0248669 A1 | 12/2004 | Kim et al. |
| 2004/0248670 A1 | 12/2004 | Okamoto et al. |
| 2004/0248671 A1 | 12/2004 | Kim et al. |
| 2004/0248672 A1 | 12/2004 | Jeon et al. |
| 2004/0254298 A1 | 12/2004 | Kim et al. |
| 2004/0266553 A1 | 12/2004 | Park et al. |
| 2004/0266554 A1 | 12/2004 | Park et al. |
| 2004/0266555 A1 | 12/2004 | Park et al. |
| 2005/0020385 A1 | 1/2005 | Onoda et al. |
| 2005/0026724 A1 | 2/2005 | Deshmukh |
| 2005/0037870 A1 | 2/2005 | Sullivan et al. |
| 2005/0059756 A1 | 3/2005 | Kim et al. |
| 2005/0075196 A1 | 4/2005 | Shimizu et al. |
| 2005/0148409 A1 | 7/2005 | Morgan et al. |
| 2005/0148725 A1 | 7/2005 | Statz et al. |
| 2005/0197211 A1 | 9/2005 | Sullivan et al. |
| 2005/0197464 A1 | 9/2005 | Handlin, Jr. |
| 2005/0197465 A1 | 9/2005 | Handlin, Jr. |
| 2005/0215963 A1 | 9/2005 | Autran et al. |
| 2005/0215964 A1 | 9/2005 | Autran et al. |
| 2005/0239575 A1 | 10/2005 | Chao et al. |
| 2005/0244638 A1 | 11/2005 | Chang et al. |
| 2005/0245652 A1 | 11/2005 | Bulpett et al. |
| 2005/0250601 A1 | 11/2005 | Kim et al. |
| 2005/0256276 A1 | 11/2005 | Elkin et al. |
| 2005/0261424 A1 | 11/2005 | Snell et al. |
| 2005/0272899 A1* | 12/2005 | Wu .................... 528/44 |
| 2005/0288446 A1 | 12/2005 | Zieske et al. |
| 2006/0014898 A1 | 1/2006 | Kim |
| 2006/0030427 A1 | 2/2006 | Kim et al. |
| 2006/0166761 A1 | 7/2006 | Kim et al. |
| 2006/0166762 A1 | 7/2006 | Kim et al. |
| 2006/0172823 A1 | 8/2006 | Loper et al. |
| 2006/0205534 A1* | 9/2006 | Egashira et al. .................... 473/351 |
| 2006/0247074 A1 | 11/2006 | Kim et al. |
| 2007/0015605 A1 | 1/2007 | Kim et al. |
| 2007/0054754 A1 | 3/2007 | Kim et al. |
| 2007/0100085 A1 | 5/2007 | Kim et al. |
| 2007/0142127 A1* | 6/2007 | Tarao .................... 473/371 |
| 2007/0142568 A1 | 6/2007 | Kim et al. |
| 2007/0213144 A1 | 9/2007 | Comeau et al. |
| 2007/0232756 A1 | 10/2007 | Kim et al. |
| 2007/0238552 A1 | 10/2007 | Kim et al. |
| 2007/0243954 A1 | 10/2007 | Sullivan et al. |
| 2008/0009371 A1 | 1/2008 | Mayer, Jr. |
| 2008/0090678 A1 | 4/2008 | Kim et al. |
| 2008/0139334 A1 | 6/2008 | Willett et al. |
| 2008/0146374 A1 | 6/2008 | Beach et al. |
| 2008/0176677 A1 | 7/2008 | Snell et al. |
| 2008/0214326 A1 | 9/2008 | Kim et al. |
| 2008/0274825 A1 | 11/2008 | Kim et al. |
| 2009/0023518 A1 | 1/2009 | Lee et al. |
| 2009/0163298 A1 | 6/2009 | Kim |
| 2009/0166924 A1 | 7/2009 | Kuttappa |
| 2009/0170633 A1* | 7/2009 | Kim et al. .................... 473/371 |
| 2009/0170634 A1 | 7/2009 | Loper et al. |
| 2009/0176601 A1 | 7/2009 | Snell et al. |
| 2009/0191981 A1 | 7/2009 | Kim et al. |
| 2010/0160081 A1 | 6/2010 | Kim et al. |
| 2010/0179002 A1 | 7/2010 | Kim et al. |

FOREIGN PATENT DOCUMENTS

| | | |
|---|---|---|
| EP | 0 577 058 | 1/1994 |
| EP | 0 601 861 | 6/1994 |
| GB | 2 278 609 | 12/1994 |
| GB | 2 320 439 | 6/1998 |
| JP | 59157122 | 9/1984 |
| JP | 60249980 | 12/1985 |
| JP | 62267357 | 11/1987 |
| JP | 63221157 | 9/1988 |
| JP | 02092379 | 4/1990 |
| JP | 04001231 | 1/1992 |
| JP | 2000-005341 | 1/2000 |
| JP | 2000-060999 | 2/2000 |
| JP | 2000-061001 | 2/2000 |
| JP | 2000-070409 | 3/2000 |
| JP | 2000-070411 | 3/2000 |
| JP | 2000-070412 | 3/2000 |
| JP | 2000-070414 | 3/2000 |
| JP | 2001-218872 | 8/2001 |
| JP | 2002-065896 | 3/2002 |
| WO | WO 93/11190 | 6/1993 |
| WO | WO 96/40378 | 12/1996 |
| WO | WO 98/43709 | 10/1998 |
| WO | WO 99/20354 | 4/1999 |
| WO | WO 99/54001 | 10/1999 |
| WO | WO 00/41773 | 7/2000 |
| WO | WO 00/57962 | 10/2000 |
| WO | WO 02/09823 | 2/2002 |
| WO | WO 02/062914 | 8/2002 |

OTHER PUBLICATIONS http://www.chemsoc.org/chembytes/ezine/2002/birkitt_july02.htm (accessed Nov. 1, 2006).

http://bppetrochemicals.com (accessed Nov. 1, 2006) (http://bp.com/modularhome.do?categoryId=-6110).

http://www.nml.csir.co.za/news/20020711/index1.htm (accessed May 29, 2007).

http://www3.interscience.wiley.com/cgi-bin/abstract/70000886/ABSTRACT (accessed May 29, 2007).

Research Disclosure 29703, E.I. DuPont de Nemours & Co., 2 pages, published Jan. 1989.

Rostek et al., "Novel Sulfur Vulcanization Accelerators Based on Mercapto-Pyridine, -Pyrazine, and -Pyrimidine," *Rubber and Chemistry Technology* 69(2):180-202, 1996.

Saunders, "Polyurethanes Chemistry and Technology Part I," pp. 32-43, 1962.

Sherman, "Close-Up on Technology—TP Elastomers—New Metallocene TP Elastomers Tackle Films, Fibers, TPOs," *Plastics Technology Online Article*, http://www.plasticstechnology.com/articles/200310cu2.html, downloaded Dec. 5, 2005.

Shuler et al., "Fate of Erucamide in Polyolefin Films at Elevated Temperature," *Polym. Eng. Sci.* 44:2247-2253, 2004.

Technical Data, *General Information about Nanomers, Nanocor*, 2 pages (No Date).

Thain, *Science and Golf IV*, pp. 319-327, Jul. 2002.

English Translation of Notice of Reasons for Rejection dispatched from the Japanese Patent Office on Feb. 20, 2008, in Japanese Application No. 2006-014614.

English Translation of Notice of Reasons for Rejection, dispatched from the Japanese Patent Office on Oct. 22, 2008, in Japanese Application No. 2006-014614.

Office Action dated Nov. 25, 2009 from U.S. Appl. No. 11/428,278.

* cited by examiner

US 8,211,976 B2

SPORTS EQUIPMENT COMPOSITIONS COMPRISING A POLYURETHANE, POLYUREA OR PREPOLYMER THEREOF AND A POLYFUNCTIONAL MODIFIER

CROSS-REFERENCE TO RELATED APPLICATIONS

This application claims the benefit of U.S. Provisional Application No. 61/016,328 filed on Dec. 21, 2007. The entire disclosure of the provisional application is considered to be part of the disclosure of the following application and is hereby incorporated by reference.

FIELD

Disclosed embodiments concern compositions comprising a polyurethane, polyurea, or prepolymer compositions thereof, further comprising a polyfunctional modifier, where the compositions are particularly useful for making sports equipment, such as golf balls.

BACKGROUND

A. Golf Ball Construction and Composition

Most modern golf balls comprise a core and at least one additional outer layer. Two-piece balls include a cover around a solid, often single-piece, spherical rubber core. Two-piece balls have high initial speeds but relatively low spin rates, and hence perform well for drives. Ball performance can be further modified by including additional layers between the core and outer cover layer. A three-piece ball has one additional layer between the core and outer cover layer, a four-piece ball results if two additional layers are introduced between the core and outer cover layer, and so on.

The materials used to make individual golf ball layers also significantly affect both the ability to process compositions, as well as the performance of golf balls made using such compositions. Currently, most golf balls utilize core compositions comprising synthetic rubbers based on polybutadiene, especially cis-1,4-polybutadiene. The properties of the core can be further modified by crosslinking. In addition, the weight and hardness of the core may be further adjusted by incorporating various filler materials. Additional compositions for forming golf balls also are disclosed in assignee's issued patents and copending applications.

B. Particular Known Golf Ball Compositions

Particular polyurethane and polyurea compositions have been used to make golf ball components, such as durable golf ball covers. Composition modifiers and processing aids also have been used with such compositions. For example, U.S. Pat. No. 4,123,061 discloses using an amine-based curing agent. The '061 patent states that:

The polyurethanes which are useful in the practice of the present invention are the urethane prepolymers made from polyethers with diisocyanates. Although any diisocyanate may be employed, the preferred diisocyanates are 2,4 tolylene diisocyanate (TDI), 4,4' diphenylmethane diisocyanate (MDI), and 3,3' dimethyl 4,4' biphenylene diisocyanate (also known as 3,3' dimethyl 4,4' biphenyl diisocyanate) (TODI). The polyether part of the prepolymer is preferably a polyalkylene ether glycol having an average molecular weight of less than 1,000 and having from about 4 to about 8 carbon atoms in the alkylene group. Best results have been obtained with polytetramethylene ether glycol. It is preferred that only polyether prepolymers be employed. Most polyester urethane prepolymers are unsatisfactory because of their high hydrolysis constant. When golf balls are made from polyester urethanes they are usually unsatisfactory. It will be understood, however, that a mixture of prepolymers can be employed if desired.

The prepolymer is cured with either a polyol or an amine-type curing agent. The polyol curing agent may be trifunctional or tetrafunctional. It is important to note that the curing agent may not be a difunctional polyol since difunctional polyols do not result in a golf ball which has the advantages of the present invention. Examples of polyol-type curing agents useful in the practice of the present invention are triisopropanol amine (TIPA) and trimethylol propane (TMP). Best results have been obtained with the TMP. As to the amine-type curing agents, there must be at least two amine groups present and best results have been obtained with aromatic diamines. Typical amine-type curing agents which are useful in the practice of the present invention are: 3,3' dichlorobenzidene; 3,3' dichloro, 4,4' diamino diphenyl methane (MOCA); N,N,N',N' tetrakis (2-hydroxy propyl)ethylene diamine (sold by Wyandotte under the trade name Quadrol); and Curalon L which is Uniroyal Inc.s' brand name for a mixture of aromatic diamines. A plurality of curing agents may be employed, if desired (emphasis added).

U.S. Pat. No. 4,123,061, column 2, line 54 through column 3, line 6.

Similarly, U.S. Pat. No. 5,334,673 discloses using amine curing agents for making polyurethane compositions. For example, the '673 patent discloses using aromatic curing agents, such as polytetramethyleneoxide-di-p-aminobenzoate. U.S. Pat. No. 5,334,673, Abstract.

U.S. Pat. No. 7,276,570 also discloses a polymeric composition ostensibly useful for producing golf balls. According to the Abstract for the '570 patent, disclosed compositions:

[C]omprise at least one polymer having a plurality of amide linkages and a plurality of anionic moieties attached thereto. These compositions can be used in any one or more portions of the golf balls, such as inner center, core, inner core layer, intermediate core layer, outer core layer, intermediate layer, cover, inner cover layer, intermediate cover layer, and/or outer cover layer.

However, as currently understood, the polymeric material disclosed by the '570 patent includes anionic moieties in the polymeric backbone, as opposed to having such moieties bonded to the polymeric backbone and available for further reactions, such as a crosslinking reaction.

Aromatic amines can cause discoloration of compositions comprising such compounds. For example, U.S. Pat. No. 7,041,769, entitled "Polyurethane Compositions for Golf Balls," states that "[f]urthermore, because the polyurethanes and polyurea used to make the covers of such golf balls generally contain an aromatic component, e.g., aromatic diisocyanate, polyol or polyamine, they are susceptible to discoloration upon exposure to light, particularly ultraviolet (UV) light." U.S. Pat. No. 7,041,769, column 2, lines 21-26. The '769 patent discloses forming polycarbonate polyols, e.g., HO—[R—OCOO—]$_n$R—OH.

Despite the previously known compositions used to make golf balls, there still is a need for additional compositions. For example, new compositions would provide additional flexibility in tailoring the physical characteristics of golf balls, would facilitate processing such compositions, or both, and hence still are in demand.

SUMMARY

Compositions useful for making sports equipment, such as golf balls, are disclosed. Golf balls comprising such compositions, and methods for forming golf balls comprising such compositions, also are disclosed.

One disclosed embodiment of a composition useful for making sports equipment comprises at least one polyurethane, polyurea, polymer precursor, blocked polyurethane, blocked polyurea, or blocked polymer precursor and an effective amount of a polyfunctional modifier. The polyfunctional modifier has at least a first functional group comprising a pendent acid functional group and at least a second pendent functional group selected from amine functional groups, functional groups that can be chemically or thermally converted into amine functional groups, hydroxyl functional groups, functional groups that can be chemically or thermally converted into hydroxyl functional groups, and combinations thereof. In some embodiments, the polyfunctional modifier is bifunctional, meaning it has at least two functional groups. In other embodiments, the polyfunctional modifier is trifunctional. In particular embodiments, the polyfunctional modifier is aliphatic and the acid functional group is a carboxylic acid functional group, a sulfonic acid group, or combinations thereof. In some embodiments, the amine functional group is either a primary amine or a secondary amine.

Some embodiments of disclosed bifunctional modifiers satisfy a formula $(X)_m\text{-(linker)}_n\text{-}(RY)_o\text{-(linker)}_p\text{-}(X)_q$ where m is 1 or greater, n is 0 or greater, o is 1 or greater, p is 0 or greater, and q is 0 or greater. X is selected from amine functional groups, functional groups that convert into amine functional groups when processed to produce sports equipment, functional groups that can be chemically converted into amine functional groups, hydroxyl functional groups, functional groups that convert to hydroxyl functional groups when processed to produce sports equipment, functional groups that be chemically converted into hydroxyl functional groups, and any and all combinations thereof. Y is an acid functional group, a functional group that can be chemically or thermally converted into an acid functional group, or a heterocyclic functional group. R is a carbon atom, a heteroatom, aliphatic, cyclic aliphatic or aromatic. R is bonded directly to the linkers and Y. The linkers may be aliphatic, cyclic aliphatic or aromatic.

Certain embodiments of disclosed bifunctional modifiers satisfy a second formula:

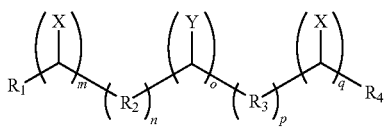

With reference to this second formula, m is 1 or greater, n is 0 or greater, o is 1 or greater, p is 0 or greater, and q is 0 or greater. $R_1$ and $R_4$ independently are selected from hydrogen, aliphatic, cyclic aliphatic, and aromatic. $R_2$ and $R_3$ independently are selected from aliphatic, cyclic aliphatic, and aromatic. X is selected as disclosed above. Y is a carboxylic acid functional group or a sulfonic acid functional group. X and Y functional groups may be external to any polymeric backbone formed, and hence available for further reaction, such as a crosslinking reaction.

Certain disclosed embodiments of trifunctional modifiers have at least two different functional groups. The two different functional groups comprise at least a first and second functional group independently selected from amine functional groups, functional groups that can be chemically or thermally converted into amine functional groups, hydroxyl functional groups, functional groups that can be chemically or thermally converted into hydroxyl functional groups, and any and all combinations thereof. The trifunctional modifier further comprises at least a third pendent functional group comprising a pendent acid or heterocyclic functional group.

Some embodiments of disclosed trifunctional modifiers satisfy a formula $(X)_m\text{-(linker)}_n\text{-}(RY)_o\text{-(linker)}_p\text{-}(Z)_q$ where m is 1 or greater, n is 0 or greater, o is 1 or greater, p is 0 or greater, and q is 1 or greater. X and Z independently are selected from amine functional groups, hydroxyl functional groups, and any and all combinations thereof, as disclosed above. Y is coupled to the compound and not bonded to either linker directly. Y is selected from an acid functional group, a functional group that can be chemically or thermally converted into an acid functional group or a heterocyclic functional group. R is a carbon atom, a heteroatom, aliphatic, cyclic aliphatic or aromatic. R is bonded directly to the linkers and Y. The linkers may be aliphatic, cyclic aliphatic, aromatic or combinations thereof.

Certain disclosed embodiments of trifunctional modifiers satisfy a second formula:

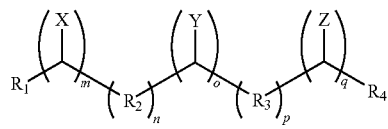

With reference to the second formula, m is 1 or greater, n is 0 or greater, o is 1 or greater, p is 0 or greater, and q is 1 or greater. $R_1$ and $R_4$ independently are selected from hydrogen, aliphatic, cyclic aliphatic, and aromatic. $R_2$ and $R_3$ independently are selected from aliphatic, cyclic aliphatic, and aromatic. X, Y and Z independently are selected as disclosed above. X, Y and Z functional groups may be external to any polymeric backbone formed, and hence available for further reaction, such as a crosslinking reaction.

Certain disclosed compositions further comprise at least one additional polymeric material. Particular embodiments of the disclosed compositions comprise a thermoplastic polyurethane, polyurea, urethane prepolymer, blocked polyurethane, blocked polyurea, or blocked urethane prepolymer composition. In certain embodiments, the polyurethane, polyurea, polymer precursor, blocked polyurethane, blocked polyurea or blocked polymer precursor comprises a polysaccharide. The polysaccharide may comprise a chitin or a chitin derivative, and may comprise at least one poly(D-glucosamine) composition. In some embodiments, the polyurethane, polyurea, polymer precursor, blocked polyurethane, blocked polyurea or blocked polymer precursor comprises a polyurethane formed by the reaction of poly(D-glucosamine) with a material having a diisocyanate or polyisocyanate group or groups. Some disclosed embodiments of the compositions further comprise a cross-linking agent, a co-cross-linking agent, a base resin, a peptizer, an accelerator, a photostabilizer, a co-initiator, an antioxidant, a colorant, a dispersant, a mold release agent, a processing aid, a fiber, a filler, and any and all combinations thereof.

Embodiments of a golf ball having at least one component comprising a composition as discussed above also are disclosed. In some embodiments, the polyfunctional modifier is a bifunctional modifier or a trifunctional modifier. Some embodiments of the golf ball further comprise a cross-linking agent, a co-cross-linking agent, a base resin, a peptizer, an accelerator, a photostabilizer, a co-initiator, an antioxidant, a colorant, a dispersant, a mold release agent, a processing aid, a fiber, a filler, and any and all combinations thereof.

In particular embodiments, the golf ball further comprises from about 1 to about 99 weight percent of an additional thermoplastic or thermoset polymeric material. In some embodiments, the additional thermoplastic or thermoset polymeric material is a polyamide, an ionomer, a polyalkenamer or combinations thereof.

Particular embodiments of the golf ball have a cover comprising the disclosed composition. Some embodiments have at least one layer comprising the composition. Other embodiments have a core, one or more intermediate layers and a cover layer. In some embodiments, the cover layer is formed from a composition comprising a reaction product of (a) diol(s), polyol(s), or combinations thereof; (b) diisocyanate(s), polisocyanate(s), or combinations thereof; (c) diamine(s), polyamine(s), or combinations thereof; or any combinations of (a), (b), and (c).

Some embodiments concern a three-piece golf ball comprising a rubber-based core, at least one intermediate layer and an outer cover layer. At least one of the intermediate layer and outer cover layer comprises the composition comprising at least one polyurethane, polyurea, or polymer precursor composition, and an effective amount of the polyfunctional modifier polymer. Further embodiments concern a four-piece golf ball comprising a rubber-based cover having a center, an inner intermediate layer, an outer intermediate layer, and a cover. At least one of the inner layer, outer intermediate layer or cover comprising the composition comprises at least one polyurethane, polyurea, or polymer precursor composition, and an effective amount of the polyfunctional modifier polymer.

In particular embodiments, the golf ball has a hardness that increases outwards from the core to the cover. In other embodiments, the golf ball has a hardness that decreases outwards from the core to the cover.

Embodiments of a method for forming a golf ball also are disclosed. Disclosed embodiments of the method comprise providing a composition comprising at least one polyurethane, polyurea, or polymer precursor composition, and an effective amount of a polyfunctional modifier as discussed above. At least one component of a golf ball is then formed comprising the composition.

DETAILED DESCRIPTION

I. Introduction

Figure 1:
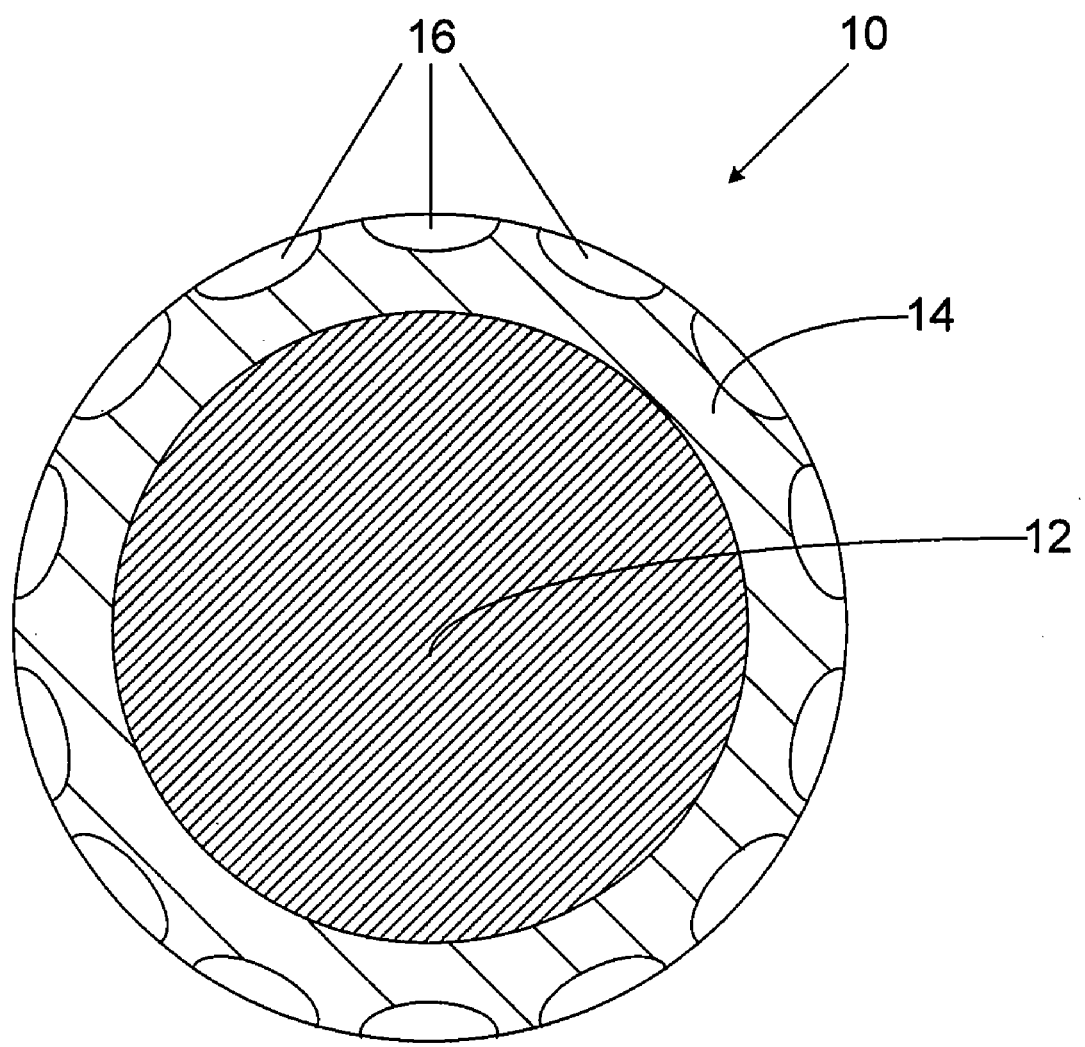
FIG. 1 is a schematic cross section of a two-piece golf ball.

Embodiments of the present invention concern compositions useful for making sports equipment, and/or which facilitate processing compositions used to make sports equipment, such as golf balls. Particular embodiments of the present invention concern polyurethanes, polyureas, prepolymer compositions thereof, blocked polyurethanes, blocked polyureas, or blocked prepolymer compositions thereof. Particular embodiments concern polyurethanes or urethane prepolymer compositions, and at least one additive having both an acid functional group and at least one additional functional group selected from amine functional groups, functional groups that can be chemically or thermally converted to amine equivalent functional groups, hydroxyl functional groups, functional groups that can be chemically or thermally converted to hydroxyl equivalent functional groups, and combinations thereof. A person of ordinary skill in the art will appreciate that disclosed compositions also can include any other material, or combinations of materials, now known or hereafter developed used to make a particular sports equipment product. Exemplary suitable materials are discussed in further detail below.

II. Definitions

The following definitions are provided to aid the reader, and are not intended to define terms to have a scope that would be narrower than would be understood by a person of ordinary skill in the art of golf ball composition and manufacture.

Any numerical values recited herein include all values from the lower value to the upper value. All possible combinations of numerical values between the lowest value and the highest value enumerated herein are expressly included in this application.

The term "bimodal polymer" refers to a polymer comprising two main fractions and more specifically to the form of the polymer's molecular weight distribution curve, i.e., the appearance of the graph of the polymer weight fraction as function of its molecular weight. When the molecular weight distribution curves from these fractions are superimposed onto the molecular weight distribution curve for the total resulting polymer product, that curve will show two maxima or at least be distinctly broadened in comparison with the curves for the individual fractions. Such a polymer product is called bimodal. It is to be noted here that also the chemical compositions of the two fractions also may be different.

The term "blocked," as applied to polymers, polymer precursors or isocyanate compounds, means that a reactive portion of the molecule has been chemically modified to render functional groups that are reactive under typical reaction conditions unreactive unless certain conditions of temperature, pressure or co-reactants are met.

As used herein, the term "core" is intended to mean the elastic center of a golf ball, which may have a unitary construction. Alternatively the core itself may have a layered construction having a spherical "center" and additional "core layers," with such layers being made of the same material or a different material from the core center.

The term "cover" is meant to include any layer of a golf ball that surrounds the core. Thus a golf ball cover may include both the outermost layer and also any intermediate layers, which are disposed between the golf ball center and outer cover layer. "Cover" may be used interchangeably with the term "cover layer".

A "fiber" is a general term and the definition provided by Engineered Materials Handbook, Vol. 2, "Engineering Plastics", published by A.S.M. International, Metals Park, Ohio, USA, is relied upon to refer to filamentary materials with a finite length that is at least 100 times its diameter, which typically is 0.10 to 0.13 mm (0.004 to 0.005 in.). Fibers can be continuous or specific short lengths (discontinuous), normally no less than 3.2 mm (⅛ in.). Although fibers according to this definition are preferred, fiber segments, i.e., parts of fibers having lengths less than the aforementioned also are considered to be encompassed by the invention. Thus, the terms "fibers" and "fiber segments" are used herein. "Fibers or fiber segments" and "fiber elements" are used to encompass both fibers and fiber segments. Embodiments of the golf ball components described herein may include fibers including, by way of example and without limitation, glass fibers, such as E fibers, Cem-Fil filament fibers, and 204 filament strand fibers; carbon fibers, such as graphite fibers, high modulus carbon fibers, and high strength carbon fibers; asbestos fibers, such as chrysotile and crocidolite; cellulose fibers; aramid fibers, such as Kevlar, including types PRD 29 and PRD 49; and metallic fibers, such as copper, high tensile steel, and stainless steel. In addition, single crystal fibers, potassium titanate fibers, calcium sulphate fibers, and fibers or filaments of one or more linear synthetic polymers such as Terylene, Dacron, Perlon, Orion, Nylon, including Nylon type 242, are contemplated. Polypropylene fibers, including monofilament and fibrillated fibers are also contemplated. Golf balls according to the present invention also can include any combination of such fibers. Fibers used in golf ball components are described more fully in Kim et al. U.S. Pat. No. 6,012,991, which is incorporated herein by reference.

The term "fully-interpenetrating network" refers to a network that includes two independent polymer components that penetrate each other, but are not covalently bonded to each other.

In the case of a ball with two intermediate layers, the term "inner intermediate layer" may be used interchangeably herein with the terms "inner mantle" or "inner mantle layer" and is intended to mean the intermediate layer of the ball positioned nearest to the core.

The term "intermediate layer" may be used interchangeably with "mantle layer," "inner cover layer" or "inner cover" and is intended to mean any layer(s) in a golf ball disposed between the core and the outer cover layer.

The term "(meth)acrylic acid copolymers" is intended to mean copolymers of methacrylic acid and/or acrylic acid.

The term "(meth)acrylate" is intended to mean an ester of methacrylic acid and/or acrylic acid.

"Nanocomposite" is a polymer matrix having nanofiller within the matrix. Nanocomposite materials and golf balls made comprising nanocomposite materials are disclosed in Kim et al., U.S. Pat. No. 6,794,447, and U.S. Pat. Nos. 5,962,553 to Ellsworth, 5,385,776 to Maxfield et al., and 4,894,411 to Okada et al., which are incorporated herein by reference in their entirety. Inorganic nanofiller materials generally are made from clay, and may be coated by a suitable compatibilizing agent, as discussed below in further detail. The compatibilizing agent allows for superior linkage between inorganic and organic material, and it also can account for the hydrophilic nature of the inorganic nanofiller material and the possibly hydrophobic nature of the polymer. Nanofiller particles typically, but not necessarily, are approximately 1 nanometer (nm) thick and from about 100 to about 1000 nm across, and hence have extremely high surface area, resulting in high reinforcement efficiency to the material at low particle loading levels. The sub-micron-sized particles enhance material properties, such as the stiffness of the material, without increasing its weight or opacity and without reducing the material's low-temperature toughness. Materials incorporating nanofiller materials can provide these property improvements at much lower densities than those incorporating conventional fillers.

Nanofillers can disperse within a polymer matrix in three ways. The nanofiller may stay undispersed within the polymer matrix. Undispersed nanofillers maintain platelet aggregates within the polymer matrix and have limited interaction with the polymer matrix. As the nanofiller disperses into the polymer matrix, the polymer chains penetrate into and separate the platelets. When viewed by transmission electron microscopy or x-ray diffraction, the platelet aggregates are expanded relative to undispersed nanofiller. Nanofillers at this dispersion level are referred to as being intercalated. A fully dispersed nanofiller is said to be exfoliated. An exfoliated nanofiller has the platelets fully dispersed throughout the polymer matrix; the platelets may be dispersed unevenly but preferably are dispersed substantially evenly.

Nanocomposite materials are materials incorporating from about 0.1% to about 20%, preferably from about 0.1% to about 15%, and most preferably from about 0.1% to about 10% nanofiller potentially reacted into and preferably substantially evenly dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. Nos. 5,962,553 to Ellsworth, 5,385,776 to Maxfield et al., and 4,894,411 to Okada et al. Examples of nanocomposite materials currently marketed include M1030D, manufactured by Unitika Limited, of Osaka, Japan, and 1015C2, manufactured by UBE America of New York, N.Y.

When nanocomposites are blended with other polymer systems, the nanocomposite may be considered a type of nanofiller concentrate. However, a nanofiller concentrate may be more generally a polymer into which nanofiller is mixed; a nanofiller concentrate does not require that the nanofiller has reacted and/or dispersed evenly into the carrier polymer. When used in the manufacture of golf balls, nanocomposite materials can be blended effectively into ball compositions at a typical weight percentage, without limitation, of from about 1% to about 50% of the total composition used to make a golf ball component, such as a cover or core, by weight.

Again, in the case of a ball with two intermediate layers, the term "outer intermediate layer" may be used interchangeably herein with the terms "outer mantle" or "outer mantle layer" and is intended to mean the intermediate layer of the ball which is disposed nearest to the outer cover layer.

The term "outer cover layer" is intended to mean the outermost cover layer of the golf ball on which, for example, the dimple pattern, paint and any writing, symbol, etc. is placed. If, in addition to the core, a golf ball comprises two or more cover layers, only the outermost layer is designated the outer cover layer. The remaining layers may be designated intermediate layers. The term outer cover layer is interchangeable with the term "outer cover".

"Polyalkenamer" is used interchangeably herein with the term "polyalkenamer rubber" and means a polymer of one or more alkenes, including cycloalkenes, having from 5-20, preferably 5-15, most preferably 5-12 ring carbon atoms. The polyalkenamers may be prepared by any suitable method including ring opening metathesis polymerization of one or more cycloalkenes in the presence of organometallic catalysts as described in U.S. Pat. Nos. 3,492,245, and 3,804,803, the entire contents of both of which are incorporated herein by reference.

"Polymer precursor material" refers to any material that can be further processed to form a final polymer material of a manufactured golf ball, such as, by way of example and not limitation, monomers that can be polymerized, or a polymerized or partially polymerized material that can undergo additional processing, such as crosslinking.

"Pseudo-crosslinked network" refers to materials that have crosslinking, but, unlike chemically vulcanized elastomers, pseudo-crosslinked networks are formed in-situ, not by covalent bonds, but instead by ionic clustering of the reacted functional groups, which clustering may disassociate at elevated temperatures.

"Semi-interpenetrating network" refers to a network that includes at least one polymer component that is linear or branched and interspersed in the network structure of at least one of the other polymer components.

"Thermoplastic material" generally refers to a material that is capable of softening or fusing when heated and of hardening again when cooled. Thermoplastic polymer chains often are not cross-linked, but the term "thermoplastic" as used herein may refer to materials that initially act as thermoplastics, such as during an initial extrusion process, but which also may be crosslinked, such as during a compression molding step to form a final structure.

"Thermoset material" generally refers to a polymer that solidifies irreversibly when exposed to energy (in the form of heat, radiation or chemical reactants). The addition of energy generally leads to formation of multidirectional linkages within the polymer, resulting in a material that has a melting temperature at or above its decomposition temperature. Thermosets generally cannot be heated to a liquid state and then cooled without significant decomposition.

Similarly the term "unimodal polymer" refers to a polymer comprising one main fraction and more specifically to the form of the polymer's molecular weight distribution curve, i.e., the molecular weight distribution curve for the total polymer product shows only a single maximum.

III. Golf Ball Composition and Construction

FIG. 1 illustrates a two-piece golf ball 10 comprising a solid center or core 12, and an outer cover layer 14. Golf balls also typically include plural dimples 16 formed in the outer cover and arranged in various desired patterns.

Figure 2:
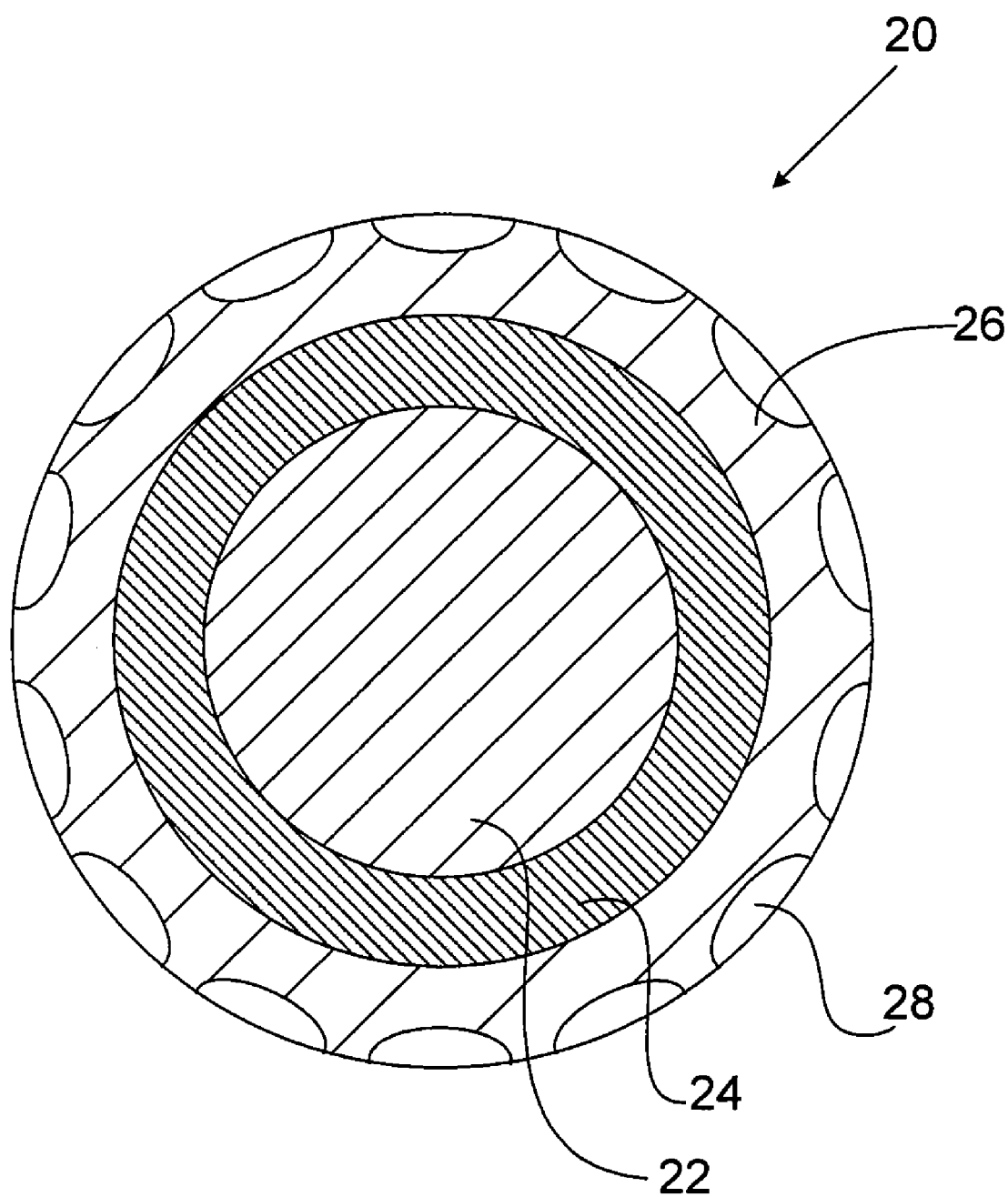
FIG. 2 is a schematic cross section of a three-piece golf ball.

FIG. 2 illustrates a 3-piece golf ball 20 comprising a core 22, an intermediate layer 24 and an outer cover layer 26. Golf ball 20 also typically includes plural dimples 28 formed in the outer cover layer 26 and arranged in various desired patterns.

Figure 3:
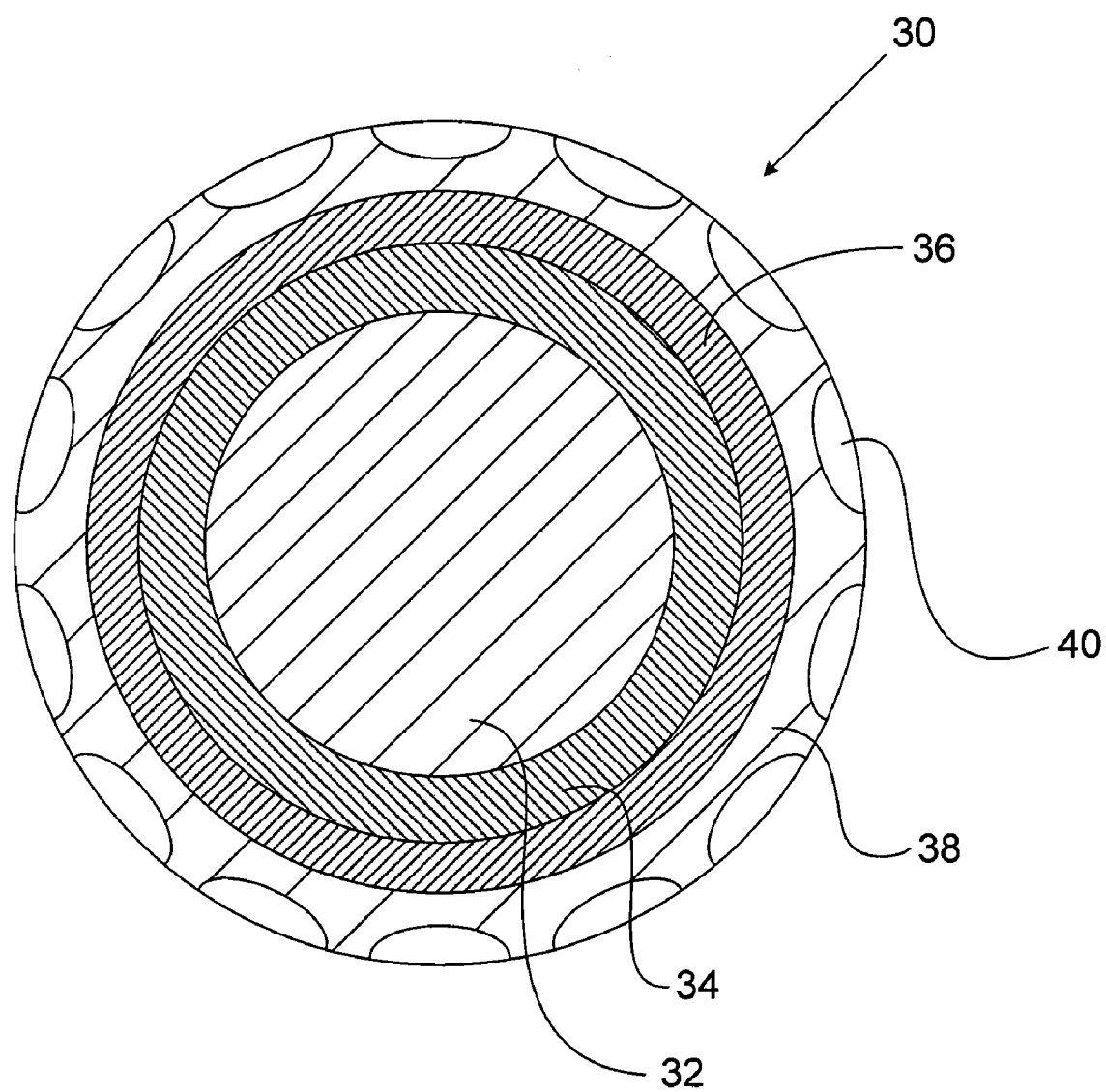
FIG. 3 is a schematic cross section of a four-piece golf ball.

FIG. 3 illustrates a 4-piece golf ball 30 comprising a core 32, an inner intermediate layer 34, an outer intermediate layer 36 and an outer cover layer 38. Golf ball 30 also typically includes plural dimples 40 formed in the outer cover layer 38 and arranged in various desired patterns.

Figure 4:
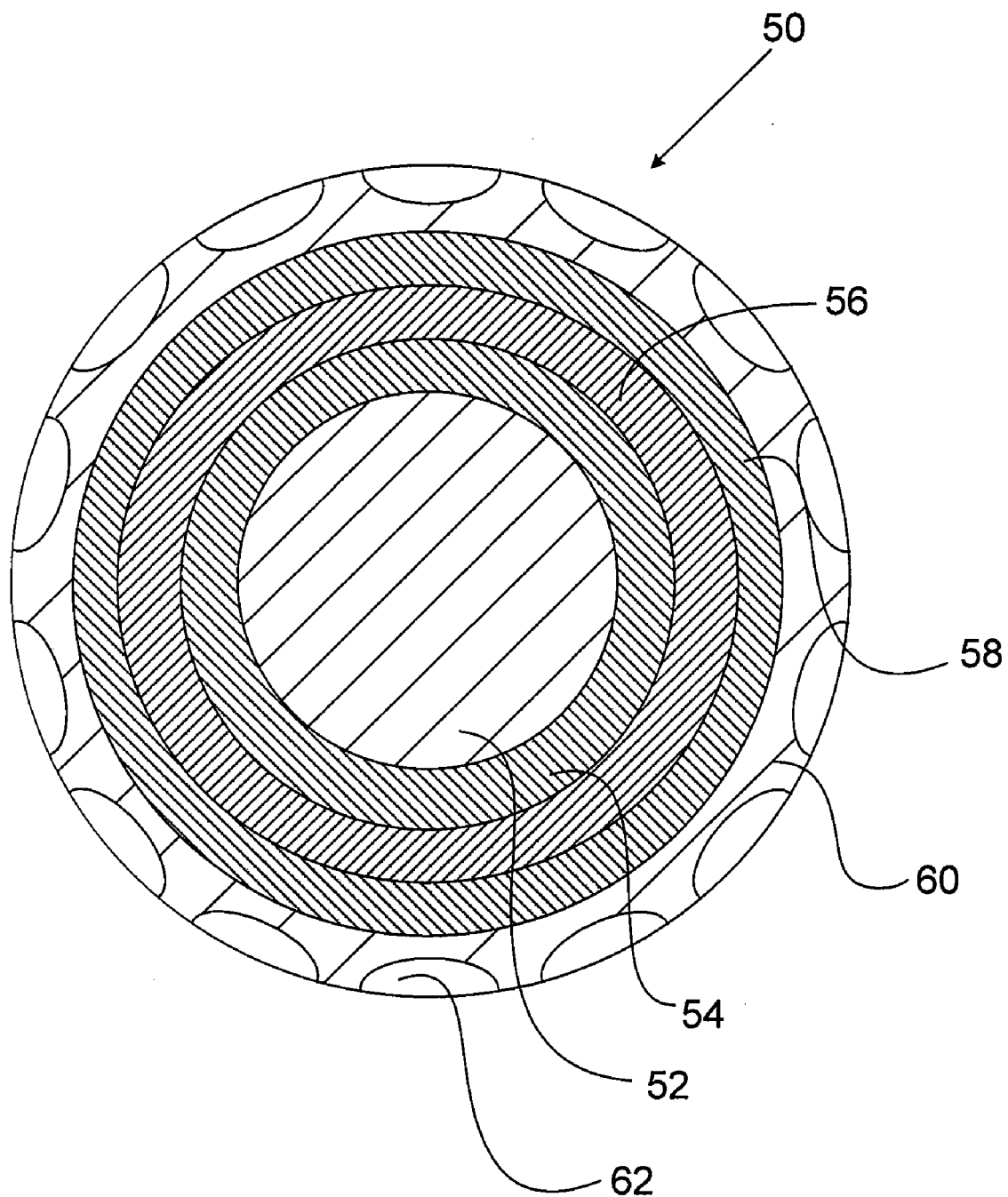
FIG. 4 is a schematic cross section of a five-piece golf ball.

FIG. 4 illustrates a 5-piece golf ball 50 comprising a core 52, a first inner intermediate layer 54, a second inner intermediate layer 56, a third inner intermediate layer 58, and an outer cover layer 60. Golf ball 50 also typically includes plural dimples 62 formed in the outer cover layer 60 and arranged in various desired patterns.

FIGS. 1-4 illustrate two- to five-piece golf ball constructions. However, a person of ordinary skill in the art will appreciate that golf balls of the present invention may comprise any number of layers, including from 0 to at least 5 intermediate layer(s), but preferably from 0 to 3 intermediate layer(s), more preferably from 1 to 3 intermediate layer(s), and most preferably 1 to 2 intermediate layer(s).

The present invention can be used to form golf balls of any desired size. "The Rules of Golf" by the USGA dictate that the size of a competition golf ball must be at least 1.680 inches in diameter; however, golf balls of any size can be used for leisure golf play. The preferred diameter of the golf balls is from about 1.680 inches to about 1.800 inches. Oversize golf balls with diameters above about 1.760 inches to as big as 2.75 inches also are within the scope of the invention.

A. Core

The core of the balls of the present invention have a diameter of from about 0.5 to about 1.64 inches, preferably from about 0.7 to about 1.62 inches, more preferably from about 1 to about 1.60 inches, yet more preferably from about 1.20 to about 1.58 inches, and most preferably from about 1.40 to about 1.54 inches.

In another preferred embodiment, the golf ball core has at least one core layer on the center core, the layer having a thickness of from about 0.01 to about 1.14 inch, preferably from about 0.02 to about 1.12 inch, more preferably from about 0.03 to about 1.10 inch and most preferably from about 0.04 to about 1 inch.

In still another embodiment, two-piece balls are disclosed comprising a core and a cover having a thickness of from about 0.01 to about 0.20 inch, preferably from about 0.02 to about 0.15 inch, more preferably from about 0.025 to about 0.10 inch and most preferably from about 0.03 to about 0.07 inch. The cover typically has a hardness greater than about 25, preferably greater than about 30, and typically greater than about 40 Shore D. Golf ball cores of the present invention typically have a PGA compression of from about 30 to about 190, preferably from about 40 to about 160, typically from about 50 to about 130, and most preferably from about 60 to about 100.

The Shore D hardness of the core center and core layers made according to the present invention may vary from about 10 to about 90, typically from about 20 to about 80, and even more typically from about 30 to about 70.

B. Intermediate Layer(s) and Cover Layer

In one preferred embodiment, the golf ball of the present invention is a three-piece ball having a core and/or at least one layer comprising a polymeric material modified as disclosed herein.

In another preferred embodiment of the present invention, the golf ball of the present invention is a four-piece ball having a core and/or at least one layer comprising a polymeric material modified as disclosed herein.

The one or more intermediate layers of the golf balls of the present invention has a thickness of from about 0.01 to about 0.20 inch, preferably from about 0.02 to about 0.15 inch, more preferably from about 0.03 to about 0.10 inch and most preferably from about 0.03 to about 0.06 inch.

The one or more intermediate layers of the golf balls of the present invention also has a Shore D hardness greater than about 10, preferably greater than about 20, and more preferably greater than about 30, and most preferably greater than about 40.

The one or more intermediate layers of the golf balls of the present invention also has a flexural modulus from about 1 to about 500, preferably from about 5 to about 300, more preferably from about 10 to about 200, and most preferably from about 20 to about 100 kpsi.

The cover layer of the balls of the present invention has a thickness of from about 0.01 to about 0.10, preferably from about 0.02 to about 0.08, more preferably from about 0.03 to about 0.07 inch.

The cover layer of the balls of the present invention has a Shore D hardness of from about 30 to about 75, preferably from about 35 to about 70, more preferably from about 40 to about 65.

C. Measurement of Golf Ball Attributes

The coefficient of restitution (COR) is an important physical attribute of golf balls. The coefficient of restitution is the ratio of the relative velocity between two objects after direct impact to the relative velocity before impact. As a result, the COR can vary from 0 to 1, with 1 being a perfectly or completely elastic collision and 0 being a perfectly or completely inelastic collision. Since the COR directly influences the ball's initial velocity after club collision and travel distance, golf ball manufacturers are interested in this characteristic for designing and testing golf balls.

One conventional technique for measuring COR uses a golf ball or golf ball subassembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/s to 180 ft/sec. As the ball travels toward the steel plate, it activates each light screen so that the time at each light screen is measured. This provides an incoming time period proportional to the ball's incoming velocity. The ball impacts the steel plate and rebounds through the light screens, which again measure the time period required to transit between the light screens. This provides an outgoing transit time period proportional to the ball's outgoing velocity. The coefficient of restitution can be calculated by the ratio of the outgoing transit time period to the incoming transit time period, $COR=T_{Out}/T_{in}$.

Another COR measuring method uses a titanium disk. The titanium disk, intending to simulate a golf club, is circular, has a diameter of about 4 inches, and has a mass of about 200 grams. The impact face of the titanium disk also may be flexible and has its own coefficient of restitution, as discussed further below. The disk is mounted on an X-Y-Z table so that its position can be adjusted relative to the launching device prior to testing. A pair of ballistic light screens are spaced apart and located between the launching device and the titanium disk. The ball is fired from the launching device toward the titanium disk at a predetermined test velocity. As the ball travels toward the titanium disk, it activates each light screen, so that the time period to transit between the light screens is measured. This provides an incoming transit time period proportional to the ball's incoming velocity. The ball impacts the titanium disk, and rebounds through the light screens which measure the time period to transit between the light screens. This provides an outgoing transit time period proportional to the ball's outgoing velocity. The COR can be calculated from the ratio of the outgoing time period to the incoming time period along with the mass of the disk (Me) and ball (Mb): COR=(Tout/Tin)×(Me+Mb)+Mb Me.

The COR depends on the golf ball construction as well as the chemical composition of the various layers. Additives are added to polymeric compositions to desirably affect certain physical properties of such compositions, particularly features associated with processing such compositions, including melt-flow properties, and COR values.

IV. Polyurethanes/Polyureas or Prepolymers Thereof and Blocked

Polyurethanes/Polyureas or Prepolymers Thereof Disclosed compositions concern any processable polyurethane, polyurea, and/or prepolymer for forming such polymers, that are useful for forming sports equipment, particularly one or more components of a golf ball, now known or hereafter developed. The disclosed compositions also concern the same class of processable polyurethane, polyurea, and/or prepolymer for forming such polymers that have been blocked to facilitate particular processing conditions or products. Blocking may be achieved in many ways, for example by terminating the polyurethane, polyurea, and/or prepolymer with a partially blocked diisocyanate or polyisocyanate. More particularly, disclosed compositions concern compositions comprising from about 0.1 weight percent to about 99.9 weight percent of at least one processable, blocked or unblocked, polyurethane, polyurea, and/or prepolymer composition thereof.

The compositions further comprise an effective amount of a polyfunctional compound, typically a bifunctional or tri-functional compound. The polyfunctional compound comprises (1) at least one pendent acid functional group, such as a sulfonic acid or carboxylic acid group, and (2) at least one additional pendent functional group selected from: amines, particularly primary and secondary amines, or functional groups equivalent thereto, e.g. that convert into amine functional groups when processed to produce sports equipment, or that can be otherwise chemically or thermally converted into amine functional groups, protected amines, with particular examples including carbamates, benzyl protected amines, etc., and even more particularly primary and secondary aliphatic amines; and hydroxyl groups or functional groups equivalent thereto, e.g. that convert into hydroxyl functional groups when processed to produce sports equipment, or that can be otherwise chemically or thermally converted into hydroxyl functional groups, protected hydroxyl groups, such as esters, silyl ethers, alkyl ethers, etc.

Disclosed compositions comprising polyurethane, polyurea, polymer precursor, blocked polyurethane, blocked polyurea, or blocked polymer precursor may comprise a polysaccharide. The polysaccharide may comprise a chitin or chitin derivative. The chitin or chitin derivative may comprise at least one poly(D-glucosamine) composition. The chitin derivative may comprise chitosan. Chitosan is a linear polysaccharide composed of randomly distributed 13-(1-4)-linked D-glucosamine and N-acetyl-D-glucosamine. Chitosan is produced commercially by deacetylation of chitin, resulting in both primary hydroxyl and primary amine groups. The degree of deacetylation in commercially available chitosan ranges from about 60% to about 100%. In certain disclosed compositions, the chitosan is more than 70% deacetylated. In certain disclosed compositions, a polyurethane is formed by the reaction of poly(D-glucosamine) with a material having a diisocyanate or polyisocyanate group or groups.

Compositions used to prepare golf balls according to the present invention also can comprise from about 0.1 to 99.9 wt % of one or more polymers in addition to the blocked or unblocked polyurethane, polyurea and/or prepolymer for forming such polymers. Moreover, disclosed compositions also may include any other material now known or hereafter developed that would be useful for forming golf balls, including by way of example and without limitation, a cross-linking agent selected from sulfur compounds, peroxides, azides, maleimides, e-beam radiation, gamma-radiation, a co-cross-linking agent comprising zinc or magnesium salts of an unsaturated fatty acid having from about 3 to about 8 carbon atoms, a base resin, a peptizer, an accelerator, a UV stabilizer, a photostabilizer, a photoinitiator, a co-initiator, an antioxidant, a colorant, a dispersant, a mold release agent, a processing aid, a fiber, a filler including a density adjusting filler, a nano-filler, an inorganic filler, an organic filler, and combinations thereof.

A. Polyurethanes and Blocked Polyurethanes

Polyurethanes are the reaction product of a diol or polyol and an isocyanate, with or without a chain extender. Polyurethanes are described in the patent literature, and some are known for use in making golf ball components. See, for example, Vedula et al., U.S. Pat. No. 5,959,059.

Isocyanates used for making the urethanes of the present invention encompass diisocyanates and polyisocyanates. Examples of suitable isocyanates include the following: trimethylene diisocyanates, tetramethylene diisocyanates, pentamethylene diisocyanates, hexamethylene diisocyanates, ethylene diisocyanates, diethylidene diisocyanates, propylene diisocyanates, butylene diisocyanates, bitolylene diisocyanates, tolidine isocyanates, isophorone diisocyanates, dimeryl diisocyanates, dodecane-1,12-diisocyanates, 1,10-decamethylene diisocyanates, cyclohexylene-1,2-diisocyanates, 1-chlorobenzene-2,4-diisocyanates, furfurylidene diisocyanates, 2,4,4-trimethyl hexamethylene diisocyanates 2,2,4-trimethyl hexamethylene diisocyanates, dodecamethylene diisocyanates, 1,3-cyclopentane diisocyanates, 1,3-cyclohexane diisocyanates, 1,3-cyclobutane diisocyanates, 1,4-cyclohexane diisocyanates, 4,4'-methylenebis(cyclohexyl isocyanates), 4,4'-methylenebis(phenyl isocyanates), 1-methyl-2,4-cyclohexane diisocyanates, 1-methyl-2,6-cyclohexane diisocyanates, 1,3-bis (isocyanato-methyl)cyclohexanes, 1,6-diisocyanato-2,2,4,4-tetra-methylhexanes, 1,6-diisocyanato-2,4,4-tetra-trimethylhexanes, trans-cyclohexane-1,4-diisocyanates, 3-isocyanato-methyl-3,5,5-trimethylcyclohexyl isocyanates, 1-isocyanato-3,3,5-trimethyl-5-isocyanatomethylcyclohexanes, cyclohexyl isocyanates, dicyclohexylmethane 4,4'-diisocyanates, 1,4-bis(isocyanatomethyl)cyclohexanes, m-phenylene diisocyanate, m-xylylene diisocyanate, m-tetramethylxylylene diisocyanates, p-phenylene diisocyanate, p,p'-biphenyl diisocyanates, 3,3'-dimethyl-4,4'-biphenylene diisocyanates, 3,3'-dimethoxy-4,4'-biphenylene diisocyanates, 3,3'-diphenyl-4,4'-biphenylene diisocyanates, 4,4'-biphenylene diisocyanates, 3,3'-dichloro-4,4'-biphenylene diisocyanates, 1,5-naphthalene diisocyanates, 4-chloro-1,3-phenylene diisocyanates, 1,5-tetrahydronaphthalene diisocyanates, meta-xylene diisocyanates, 2,4-toluene diisocyanates, 2,4'-diphenylmethane diisocyanates, 2,4-chlorophenylene diisocyanates, 4,4'-diphenylmethane diisocyanates, p,p'-diphenylmethane diisocyanate, 2,4-tolylene diisocyanates, 2,6-tolylene diisocyanates, 2,2-diphenylpropane-4,4'-diisocyanate, 4,4'-toluidine diisocyanates, dianisidine diisocyanates, 4,4'-diphenyl ether diisocyanates, 1,3-xylylene diisocyanates, 1,4-naphthylene diisocyanates, azobenzene-4,4'-diisocyanates, diphenyl sulfone-4,4'-diisocyanates, triphenylmethane 4,4',4''-triisocyanates, isocyanatoethyl methacrylates, 3-isopropenyl-α,α-dimethylbenzyl-isocyanates, dichlorohexamethylene diisocyanates, ω,ω'-diisocyanato-1,4-diethylbenzenes, polymethylene polyphenylene polyisocyanates, polybutylene diisocyanates, isocyanurate modified compounds, and carbodiimide modified compounds, as well as biuret modified compounds of the above polyisocyanates. Each isocyanate may be used either alone or in combination with one or more other isocyanates. These isocyanate mixtures can include triisocyanates, such as biuret of hexamethylene diisocyanate and triphenylmethane triisocyanate, and polyisocyanates, such as polymeric diphenylmethane diisocyanate.

Polyols used for making the polyurethane in the copolymer include polyester polyols, polyether polyols, polycarbonate polyols and polybutadiene polyols. Polyester polyols are prepared by condensation or step-growth polymerization utilizing diacids. Primary diacids for polyester polyols are adipic acid and isomeric phthalic acids. Adipic acid is used for materials requiring added flexibility, whereas phthalic anhydride is used for those requiring rigidity. Some examples of polyester polyols include poly(ethylene adipate) (PEA), poly(diethylene adipate) (PDA), poly(propylene adipate) (PPA), poly(tetramethylene adipate) (PBA), poly(hexamethylene adipate) (PHA), poly(neopentylene adipate) (PNA), polyols composed of 3-methyl-1,5-pentanediol and adipic acid, random copolymer of PEA and PDA, random copolymer of PEA and PPA, random copolymer of PEA and PBA, random copolymer of PHA and PNA, caprolactone polyol obtained by the ring-opening polymerization of ε-caprolactone, and polyol obtained by opening the ring of β-methyl-6-valerolactone with ethylene glycol can be used either alone or in a combination thereof. Additionally, polyester polyols may be composed of a copolymer of at least one of the following acids and at least one of the following glycols. The acids include terephthalic acid, isophthalic acid, phthalic anhydride, oxalic acid, malonic acid, succinic acid, pentanedioic acid, hexanedioic acid, octanedioic acid, nonanedioic acid, adipic acid, azelaic acid, sebacic acid, dodecanedioic acid, dimer acid (a mixture), p-hydroxybenzoate, trimellitic anhydride, ε-caprolactone, and β-methyl-δ-valerolactone. The glycols includes ethylene glycol, propylene glycol, butylene glycol, pentylene glycol, 1,4-butanediol, 1,5-pentanediol, 1,6-hexanediol, neopentylene glycol, polyethylene glycol, polytetramethylene glycol, 1,4-cyclohexane dimethanol, pentaerythritol, and 3-methyl-1,5-pentanediol.

Polyether polyols are prepared by the ring-opening addition polymerization of an alkylene oxide (e.g. ethylene oxide and propylene oxide) with an initiator of a polyhydric alcohol (e.g diethylene glycol), which has an active hydrogen. Specifically, polypropylene glycol (PPG), polyethylene glycol (PEG) or propylene oxide-ethylene oxide copolymer can be obtained. Polytetramethylene ether glycol (PTMG) is prepared by the ring-opening polymerization of tetrahydrofuran, produced by dehydration of 1,4-butanediol or hydrogenation of furan. Tetrahydrofuran can form a copolymer with alkylene oxide. Specifically, tetrahydrofuran-propylene oxide copolymer or tetrahydrofuran-ethylene oxide copolymer can be formed. A polyether polyol may be used either alone or in a mixture.

Polycarbonate polyols are obtained by the condensation of a known polyol (polyhydric alcohol) with phosgene, chloroformic acid ester, dialkyl carbonate or diallyl carbonate. A particularly preferred polycarbonate polyol contains a polyol component using 1,6-hexanediol, 1,4-butanediol, 1,3-butanediol, neopentylglycol or 1,5-pentanediol. A polycarbonate polyol can be used either alone or in a mixture.

Polybutadiene polyols include liquid diene polymer containing hydroxyl groups, and an average of at least 1.7 functional groups, and may be composed of diene polymers or diene copolymers having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant. A polybutadiene polyol can be used either alone or in a mixture.

Urethanes used to practice the present invention also may incorporate chain extenders. Non-limiting examples of these extenders include polyols, polyamine compounds, and mixtures of these. Polyol extenders may be primary, secondary, or tertiary polyols. Specific examples of monomers of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol.

Suitable polyamines that may be used as chain extenders include primary, secondary and tertiary amines. Polyamines have two or more amine functional groups. Examples of polyamines include, without limitation: aliphatic diamines, such as tetramethylenediamine, pentamethylenediamine, hexamethylenediamine; alicyclic diamines, such as 3,3'-dimethyl-4,4'-diamino-dicyclohexyl methane; or aromatic diamines, such as 4,4'-methylene bis-2-chloroaniline, dimethylthio-2,4-toluene diamine, diethyl-2,4-toluene diamine, 2,2',3,3'-tetrachloro-4,4'-diaminophenyl methane, p,p'-methylenedianiline, p-phenylenediamine or 4,4'-diaminodiphenyl; and 2,4,6-tris(dimethylaminomethyl) phenol, and any and all combinations thereof. A chain extender may be used either alone or in a mixture.

Any of the above referenced polyurethanes may be used as a blocked polyurethane. One way to accomplish this blocking is by partial or complete reaction with a partially blocked isocyanate or polyisocyanate at the terminus of the polymer. The isocyanate may be partially blocked using a blocking group such as ketoxime, phenol, diethyl malonate, 3,5 dimethylpyrazole, diisopropylamine, 1,2,4 triazole, 1,2 pyrazole, butanone oxime, caprolactam and combinations thereof.

V. Polyfunctional Polymer or Polymer Precursor Modifiers

Compositions of the present invention comprise polyfunctional modifier(s). These polyfunctional modifiers are exemplified by bifunctional and trifunctional modifiers discussed in more detail below. The polyfunctional modifier may be monomeric, oligomeric or polymeric. The polyfunctional modifier has at least one pendent acid functional group or heterocyclic functional group. The acid group typically is a carboxylic acid, a carboxylate, a sulfonic acid, and/or sulfonate, most typically a carboxylic acid functional group or carboxylate. The heterocyclic group typically is a malemide, an epoxide or an episulfide. Additionally, the polyfunctional modifier has at least one additional functional group selected from amine functional groups, functional groups that convert into amine functional groups when processed as disclosed herein to produce sports equipment, or that can be otherwise chemically or thermally converted into amine functional groups, protected amines, hydroxyl functional groups, functional groups that convert to hydroxyl functional groups when processed as disclosed herein to produce sports equipment, protected hydroxyl groups or that can be otherwise chemically or thermally converted into hydroxyl functional groups, and any and all combinations thereof. Suitable amine functional groups generally are either primary amines or secondary amines. Functional groups that convert into, or that can be converted into, suitable amine functional groups include, solely by way of example and without limitation, imines, amine/sodium chloride complex in dioctyl phthalate, nitro groups, nitriles, carbonyls, such as by reductive amination, and amides, such as by Hofmann degradation. Examples of functional groups that convert into, or that can be chemically converted into, hydroxyl groups include, solely for example, and without limitation, protected hydroxyl groups, and carbonyl-based compounds, such as aldehydes and ketones.

The polyfunctional modifier can be used in amounts effective to achieve a desired result. Effective amounts currently are believed to range from about 0.1 to about 50, more typically from about 1 to about 45, by weight with respect to total composition weight.

Particular embodiments of the present invention concern compositions comprising a polyurea or polyurethane-urea that are formed as a reaction product between a polyfunctional polyester additive or metal cation neutralized polyfunctional polyester additive and an isocyanate terminated prepolymer.

A. Bifunctional Modifiers

Accordingly, a first general formula useful for describing bifunctional modifiers according to the present invention is X-Y-X. With reference to this general formula, X is an amine functional group, a functional group equivalent thereto, a hydroxyl functional group, or a functional group equivalent thereto. Y is an acid functional group. This general formula includes compounds where the X and Y functional groups are directly coupled to each other, such as amino carboxylic acids and amino sulfonic acids. However, this first general formula does not require that the X and Y groups be directly coupled to each other.

Bifunctional modifiers also satisfy a formula $(X)_m$-$(linker)_n$-$(Y)_o$-$(linker)_p$-$(X)_q$ where m is 1 or greater; n is 0 or greater; o is 1 or greater; p is 0 or greater; q is 0 or greater. X is selected from amine functional groups, functional groups that convert into amine functional groups when processed to produce sports equipment, functional groups that can be chemically converted into amine functional groups, hydroxyl functional groups, functional groups that convert to hydroxyl functional groups when processed to produce sports equipment, functional groups that be chemically converted into hydroxyl functional groups, and any and all combinations thereof. Y is a carboxylic acid functional group or a sulfonic acid functional group.

More typically, modifiers of the present invention do not have X and Y functional groups directly coupled together and instead typically include functional groups or moieties other than the amine and acid functional groups. Such compounds typically satisfy the general formula X-linker-Y or X-linker-Y-linker-X, where X and Y are as described above.

The linker can be any group, or combinations of groups, as long as the resulting compound still performs as a polymer or polymer precursor modifier as disclosed herein. The linker typically is an organic group, more typically an aliphatic, cyclic aliphatic or aromatic group.

A more specific, but still general, chemical formula to describe additives of the present invention is as provided below.

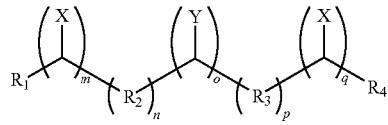

With reference to this third general formula, m is 1 or greater, n is 0 or greater, o is 1 or greater, p is 0 or greater, q is 0 or greater. $R_1$ and $R_4$ independently are selected from hydrogen, aliphatic, cyclic aliphatic, and aromatic. $R_2$ and $R_3$ independently are selected from aliphatic, cyclic aliphatic, and aromatic. X is selected from amine functional groups, functional groups that can be chemically or thermally converted into amine functional groups, hydroxyl functional groups, functional groups that can be chemically or thermally converted into hydroxyl functional groups, and any and all combinations thereof. Y is an acid functional group, a functional group that can be chemically or thermally converted into an acid functional group, or a heterocyclic functional group. In some embodiments, Y comprises a carboxylic acid, a sulfonic acid, a maleimide, an epoxide or an episulfide.

B. Trifunctional Modifiers

The trifunctional modifier has at least one pendent acid functional group or heterocyclic functional group. The acid group typically is a carboxylic acid, a carboxylate, a sulfonic acid, and/or sulfonate, most typically a carboxylic acid functional group or carboxylate. The heterocyclic group typically is a malemide, an epoxide or an episulfide. Additionally, the trifunctional modifier has at least two other functional groups selected from amine functional groups, functional groups that convert into amine functional groups when processed as disclosed herein to produce sports equipment, or that can be otherwise chemically or thermally converted into amine functional groups, protected amines, hydroxyl functional groups, functional groups that convert to hydroxyl functional groups when processed as disclosed herein to produce sports equipment, protected hydroxyl groups or that can be otherwise chemically or thermally converted into hydroxyl functional groups, and any and all combinations thereof. Suitable amine functional groups generally are either primary amines or secondary amines.

Accordingly, a first general formula useful for describing trifunctional modifiers according to the present invention is X-Y-Z. With reference to this general formula, X and Z independently are amine functional groups, a functional group equivalent thereto, a hydroxyl functional group, or a functional group equivalent thereto. Y is selected from an acid functional group, a functional group that can be chemically or thermally converted into an acid functional group or a heterocyclic functional group. This general formula includes compounds where the X, Y and/or Z functional groups are directly coupled to each other, such as amino carboxylic acids and amino sulfonic acids. However, this first general formula does not require that the X, Y and or Z groups be directly coupled to each other.

Trifunctional modifiers also satisfy a formula $(X)_m$-$(linker)_n$-$(RY)_o$-$(linker)_p$-$(Z)_q$ where m is 1 or greater, n is 0 or greater, o is 1 or greater, p is 0 or greater, q is 1 or greater. X and Z independently are selected from amine functional groups, functional groups that convert into amine functional groups when processed to produce sports equipment, or that can be otherwise chemically or thermally converted into amine functional groups, hydroxyl functional groups, functional groups that convert to hydroxyl functional groups when processed to produce sports equipment, or that can be otherwise chemically or thermally converted into hydroxyl functional groups, and any and all combinations thereof. Y is coupled to the compound and not bonded to either linker. Y is directly selected from an acid functional group, a functional group that can be chemically or thermally converted into an acid functional group, or a heterocyclic functional group. R is a carbon atom, a heteroatom, aliphatic, cyclic aliphatic or aromatic and bonded directly to the linkers and Y.

More typically, modifiers of the present invention do not have X and/or Z functional groups and a Y functional group directly coupled together and instead typically include functional groups or moieties other than the amine and acid functional groups. Such compounds typically satisfy the general formula X-linker-Y-linker-Z, where X, Y and Z are as described above.

The linker can be an atom, or groups of atoms between the functional groups defined as X, Y and Z, as long as the resulting compound still performs as a polymer or polymer precursor modifier as disclosed herein. The linker typically is an organic group, more typically an aliphatic, cyclic aliphatic or aromatic group. Moreover, particular embodiments include terminal functional groups, generally indicated as X and Z, and a pendant functional group Y, typically not directly bonded to the other functional groups.

A more specific, but still general, chemical formula to describe additives of the present invention is as provided below.

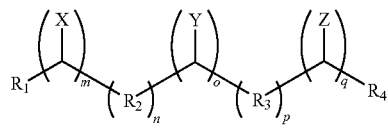

With reference to this third general formula, m is 1 or greater, n is 0 or greater, o is 1 or greater, p is 0 or greater, q is 1 or greater, $R_1$ and $R_4$ independently are selected from hydrogen, aliphatic, cyclic aliphatic and aromatic, $R_2$ and $R_3$ independently are selected from aliphatic, cyclic aliphatic and aromatic; X and Z independently are selected from amine functional groups, functional groups that convert into amine functional groups when processed to produce sports equipment, or that can be otherwise chemically or thermally converted into amine functional groups, hydroxyl functional groups, functional groups that convert to hydroxyl functional groups when processed to produce sports equipment, or that can be otherwise chemically or thermally converted into hydroxyl functional groups, and any and all combinations thereof, and Y is selected from an acid functional group, a functional group that can be chemically or thermally converted into an acid functional group or a heterocyclic functional group.

C. Amine-Carboxylic Acid Additives

Certain polyfunctional modifiers are amino acids. Particular examples of amine-carboxylic acid compounds include monomeric, oligomeric, or polymeric alanine, arginine, asparagine, aspartic acid, cysteine, glutamine, glutamic acid, glycine, histidine, isoleucine, leucine, lysine, methionine, phenylalanine, serine, threonine, tryptophan, tyrosine, valine, L-dihydroxyphenylalanine, and 5-hydroxytryptophan, copolymers or any mixtures thereof; or organic, inorganic, or metal salts thereof.

D. Hydroxyl-Carboxylic Acid Additives

Particular embodiments of polyfunctional modifiers are hydroxyl-carboxylic acids. Particular examples of such compounds include monomeric, oligomeric, or polymeric dimethylolpropionic acid, or D-saccharic acid, dimethylolpropionic acid initiated polycaprolactone, dimethylolpropionic acid terminated polyester polyol, dimethylolpropionic acid terminated polyether polyol, and α-hydroxyl-ω(carboxylic acid) functionalized polymers such as poly(caprolactone), polyethylene oxide, polyethylene glycol, acid-functionalized derivatives of polyester polyol, polyether polyol, polytetramethylene glycol, copolymers or any mixtures thereof; or organic, inorganic, or metal salts thereof.

Various embodiments of useful bifunctional modifiers are commercially available, such as Rucote® polyester resins that are available from Bayer Material Science. According to Bayer's website, Rucote® polyester resins are 100 percent thermosetting-powder-polyesters for powder coatings. These polyesters further include additional functional groups, namely (OH) hydroxyl and (COOH) carboxyl functional groups. These products are sold for the purpose of being "combined with curatives such as blocked polyisocyanates, triglycidyl isocyanurate (TGIC), β-hydroxyalkylamide (HAA) or epoxies to form high quality, cost-effective, environmentally friendly polyurethane powder coatings." Thirtyeight different Rucote® product grades are commercially available having different chemical compositions and properties. Material data sheets are available for these compounds from Bayer Material Science. Specific examples include RUCOTE® 107 polymer, a polyester based primarily on terephthalic acid and 2,2-dimethyl-1,3-propanediol with a hydroxyl number of about 48; and RUCOTE® 107, a polyester based primarily on isophthalic acid and trimethylol propane having a hydroxyl number of about 270.

These hydroxyl functionalized polyester resins further include hydroxyl and carboxyl functional groups. Rucote® products are sold for the purpose of being "combined with curatives such as blocked isocyanates, triglycidyl isocyanate (TGIC), β-hydroxyalkylamide (HAA), or epoxies to form high quality, cost effective, environmentally friendly polyurethane powder coatings." Eight different Rucote® grades are commercially available having different chemical compositions and properties. Specific examples include RUCOTE® 102, 106, 107 and 118 polyester-based resins with a hydroxyl number of about 30-50 and a carboxyl number of about 10-20.

A person of ordinary skill in the art will appreciate that compounds of this particular class may have variable numbers of hydroxyl functional groups and carboxylic acid functional groups. The number of hydroxyl groups can vary from 1 to about 1,000, and more typically from about 5 to about 500. Similarly the number of carboxylic acid functional groups can vary from 1 to about 500, and more typically from about 10 to about 200.

Various embodiments of useful trifunctional modifiers are commercially available, such as DICAP® 3030, DICAP® 2020, DICAP® 1010, DMPA (dimethylolpropionic acid), and RES AM 0135 (all available from GEO specialty chemicals), RUCOTE® 102, 106, 107, and 118 grades (all available from Bayer MaterialScience LLC). Material data sheets are available for these compounds from GEO specialty chemicals and Bayer MaterialScience LLC. According to GEO's website, DICAP® 3030 DICAP® 2020, and DICAP® 1010 materials are dimethylolpropionic acid initiated polycaprolactone oligomers. These acid-functionalized, saturated oligomers further include hydroxyl and carboxyl functional groups. DICAP® products are sold for the purpose of being combined with polyester, polyether, acrylic, or polycarbonate polyols to formulate pre-polymer, polyurethane, polyurea, for polyurethane dispersions or blended into two component systems to improve wetting, flexibility, and adhesion. DICAP® 3030 has a hydroxyl number of about 30-38 and a carboxyl number of about 15-20, DICAP® 2020 has a hydroxyl number of about 50-60 and a carboxyl number of about 25-30, and DICAP® 1010 has a hydroxyl number of about 104-114 and a carboxylic acid number of about 52-57. RES AM 0135 is a dimethylolpropionic acid terminated adipate polyester resin that has terminal hydroxyl and carboxyl functional groups. RES AM 0135 has a hydroxyl number of about 100-115 and a carboxylic acid number of about 100-115.

Certain embodiments of these compositions further include a thermoplastic polyurethane or polyurethanes, a urethane prepolymer composition, or combinations thereof. A person of ordinary skill in the art will appreciate that these compounds can include various functional groups, and combinations thereof, particularly unreacted functional groups, i.e. functional groups not involved in an initial, or perhaps even one or more subsequent polymerization reaction. These unreacted functional groups are, as a result, available for a subsequent reaction, if desired.

As yet another option, compositions may have carboxylic acid functional groups that will not or have not reacted. These acid functional groups can be either partially or fully converted to the corresponding conjugate base.

E. Forming Compositions Comprising Modifiers

Golf ball cover layers and/or at least one intermediate golf ball layer can be made using disclosed compositions. Typically, a compound (or compounds) having a polyfunctional modifier is mixed with a suitable polymer or prepolymer composition, such as a polyurethane and/or a urethane prepolymer and/or a blocked polyurethane and/or a blocked urethane prepolymer composition, in effective relative amounts. Other materials useful for forming golf ball layer compositions as disclosed herein or otherwise known to a person of ordinary skill in the art can be added individually and in any and all combinations to form compositions within the scope of the present invention. Composition components are mixed using suitable apparatuses and methods known to persons of ordinary skill in the art including, but not limited to, dry mixing, two-roll milling, banbury mixers, extruders, and combinations thereof. Optionally, solutions comprising the compound having both an amine and/or hydroxyl functional group, or their equivalent, and an acid functional group, or its equivalent, may be formulated and then used for dip coating or spraying to facilitate mixing.

Compounds formed according to disclosed embodiments may have unreacted acid functional groups. These acid functional groups may be converted to the corresponding conjugate base, either partially or completely as desired for a particular result, using various salt-forming reagents, such as metal based bases, ammonium cation bases, etc. In some embodiments, the acid functional group is neutralized in a one-step reaction when the modifier is mixed with a suitable polymer or prepolymer composition and a salt-forming reagent. In other embodiments, the acid functional group is neutralized in a subsequent reaction with a salt-forming reagent after the modifier has been incorporated into the polymeric compound. Specific examples of suitable bases for partial or total neutralization of the acid functional group include all compounds sufficiently basic to deprotonate the acid functional group, including but not limited to, metal oxides, metal hydroxides, metal carbonates, metal bicarbonates and metal acetates. The metal ions may include, but are not limited to, Group IA, IB, IIA, IIB, IIIA, IIIB, IVA, IVB, VA, VB, VIIA, VIIB, VIIB and VIIIB metal ions, or combinations thereof, typically Group Ia, Group Ia or Group IIb metal ions. Preferred metal ions of such compounds include lithium ($Li^+$), sodium ($Na^+$), potassium ($K^+$), magnesium ($Mg^{2+}$), zinc ($Zn^{2+}$), cesium ($Cs^+$), rubidium ($Rb^+$), calcium ($Ca^{2+}$), barium ($Ba^{2+}$), manganese ($Mn^{2+}$), strontium ($Sr^{2+}$), aluminum ($Al^{2+}$ or $^{3+}$), tungsten ($W^{4+}$ or $^{6+}$) zirconium ($Zr^{4+}$), titanium ($Ti^{4+}$) and hafnium ($Hf^{4+}$), and most typically a Group I metal ion, such as sodium or lithium. Alternatively, the counterion might be a positively charged organic species, such as an ammonium or substituted ammonium cation.

VI. Additional Materials Useful for Making Sports Equipment

The following materials are provided solely as examples of materials useful for forming golf ball cores, intermediate layers, and/or cover layers. A person of ordinary skill in the art will recognize that the present invention is not limited solely to those materials listed herein by way of example. Moreover, a person of ordinary skill in the art also will recognize that various combinations of such materials can be used to form the core, intermediate layer(s) and/or outer cover layer.

Additional guidance for selecting materials useful for making golf balls according to the disclosed embodiments is provided by considering those physical properties desirable for making golf balls. In addition to the exemplary list of materials provided herein, a person of ordinary skill in the art might consider compression, hardness, density, flexural modulus, elasticity, COR, impact durability, tensile properties, melt flow index, acoustic behavior, compatibility, processability, etc., in view of values stated herein for such properties, values that are typical in the field, or values that otherwise would be known to a person of ordinary skill in the field.

A. General Description of Polymeric Materials

Polymeric materials generally considered useful for making golf balls according to the process of the present invention include, without limitation, synthetic and natural rubbers, thermoset polymers such as thermoset polyurethanes and thermoset polyureas, as well as thermoplastic polymers including thermoplastic elastomers such as metallocene catalyzed polymer, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, thermoplastic polyurethanes, thermoplastic polyureas, polyamides, copolyamides, polyesters, copolyesters, polycarbonates, polyolefins, halogenated (e.g. chlorinated) polyolefins, halogenated polyalkylene compounds, such as halogenated polyethylene [e.g. chlorinated polyethylene (CPE)], polyalkenamer, polyphenylene oxides, polyphenylene sulfides, diallyl phthalate polymers, polyimides, polyvinyl chlorides, polyamide-ionomers, polyurethane-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic copolymers, functionalized styrenic copolymers, functionalized styrenic terpolymers, styrenic terpolymers, cellulosic polymers, liquid crystal polymers (LCP), ethylene-propylene-diene terpolymers (EPDM), ethylene-vinyl acetate copolymers (EVA), ethylene-propylene copolymers, ethylene vinyl acetates, polyureas, and polysiloxanes and any and all combinations thereof.

More specific examples of particular polymeric materials useful for making golf ball cores, optional intermediate layer(s) and outer covers, again without limitation, are provided below.

B. Polyalkenamers

Examples of suitable polyalkenamer rubbers are polypentenamer rubber, polyheptenamer rubber, polyoctenamer rubber, polydecenamer rubber and polydodecenamer rubber. For further details concerning polyalkenamer rubber, see *Rubber Chem. & Tech.*, Vol. 47, page 511-596, 1974, which is incorporated herein by reference. Polyoctenamer rubbers are commercially available from Degussa AG of Dusseldorf, Germany, and sold under the trademark VESTENAMER®. Two grades of the VESTENAMER® trans-polyoctenamer are commercially available: VESTENAMER 8012 designates a material having a trans-content of approximately 80% (and a cis-content of 206%) with a melting point of approximately 54° C.; and VESTENAMER 6213 designates a material having a trans-content of approximately 60% (cis-content of 40%) with a melting point of approximately 30° C. Both of these polymers have a double bond at every eighth carbon atom in the ring.

The polyalkenamer rubber preferably contains from about 50 to about 99, preferably from about 60 to about 99, more preferably from about 65 to about 99, even more preferably from about 70 to about 90 percent of its double bonds in the trans-configuration. The preferred form of the polyalkenamer for use in the practice of the invention has a trans content of approximately 80%; however, compounds having other ratios of the cis- and trans-isomeric forms of the polyalkenamer also can be obtained by blending available products for use in the invention.

The polyalkenamer rubber has a molecular weight (as measured by GPC) from about 10,000 to about 300,000, preferably from about 20,000 to about 250,000, more preferably from about 30,000 to about 200,000, even more preferably from about 50,000 to about 150,000.

The polyalkenamer rubber has a degree of crystallization (as measured by DSC secondary fusion) from about 5% to about 70%, preferably from about 6% to about 50%, more preferably from about from 6.5% to about 50%, even more preferably from about from 7% to about 45%.

More preferably, the polyalkenamer rubber used in the present invention is a polymer prepared by polymerization of cyclooctene to form a trans-polyoctenamer rubber as a mixture of linear and cyclic macromolecules.

Prior to its use in the golf balls of the present invention, the polyalkenamer rubber may be further formulated with one or more of the following blend components:

1. Polyalkenamer Cross-Linking Agents

Any crosslinking or curing system typically used for rubber crosslinking may be used to crosslink the polyalkenamer rubber used in the present invention. Satisfactory crosslinking systems are based on sulfur-, peroxide-, azide-, maleimide- or resin-vulcanization agents, which may be used in conjunction with a vulcanization accelerator. Examples of satisfactory crosslinking system components are zinc oxide, sulfur, organic peroxide, azo compounds, magnesium oxide, benzothiazole sulfenamide accelerator, benzothiazyl disulfide, phenolic curing resin, m-phenylene bis-maleimide, thiuram disulfide and dipentamethylene-thiuram hexasulfide.

More preferable cross-linking agents include peroxides, sulfur compounds, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the present invention can be brought about by applying thermal energy, shear, irradiation, reaction with other chemicals, or any combination of these. Both homolytically and heterolytically decomposed peroxide can be used in the present invention. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl)benzene; t-butylperoxybenzoate; 2,5-dimethyl-2,5-di-(t-butylperoxy)hexyne-3, such as Trigonox 145-45B, marketed by Akzo Nobel Polymer Chemicals of Chicago, Ill.; 1,1-bis(t-butylperoxy)-3,3,5 tri-methylcyclohexane, such as Varox 231-XL, marketed by R.T. Vanderbilt Co., Inc., of Norwalk, Conn.; and di-(2,4-dichlorobenzoyl)peroxide.

The cross-linking agents are blended with the polymeric material in effective amounts, which typically vary in total amounts of from about 0.05 part to about 5 parts, more preferably about 0.2 part to about 3 parts, and most preferably about 0.2 part to about 2 parts, by weight of the cross-linking agents per 100 parts by weight of the polyalkenamer rubber.

Each peroxide cross-linking agent has a characteristic decomposition temperature at which 50% of the cross-linking agent has decomposed when subjected to that temperature for a specified time period ($t_{1/2}$). For example, 1,1-bis-(t-butylperoxy)-3,3,5-tri-methylcyclohexane at $t_{1/2}$=0.1 hr has a decomposition temperature of 138° C. and 2,5-dimethyl-2,5-di-(t-butylperoxy)hexyne-3 at $t_{1/22}$=0.1 hr has a decomposition temperature of 182° C. Two or more cross-linking agents having different characteristic decomposition temperatures at the same $t_{1/2}$ may be blended in the composition. For example, where at least one cross-linking agent has a first characteristic decomposition temperature less than 150° C., and at least one cross-linking agent has a second characteristic decomposition temperature greater than 150° C., the composition weight ratio of the at least one cross-linking agent having the first characteristic decomposition temperature to the at least one cross-linking agent having the second characteristic decomposition temperature can range from 5:95 to 95:5, or more preferably from 10:90 to 50:50.

Besides the use of chemical cross-linking agents, exposure of the polyalkenamer rubber composition to radiation also can serve as a cross-linking agent. Radiation can be applied to the polyalkenamer rubber mixture by any known method, including using microwave or gamma radiation, or an electron beam device. Additives may also be used to improve radiation-induced crosslinking of the polyalkenamer rubber.

2. Co-Cross-Linking Agent

The polyalkenamer rubber may also be blended with a co-cross-linking agent, which may be a metal salt of an unsaturated carboxylic acid. Examples of these include zinc and magnesium salts of unsaturated fatty acids having from about 3 to about 8 carbon atoms, such as acrylic acid, methacrylic acid, maleic acid, fumaric acid and palmitic acid, with the zinc salts of acrylic and methacrylic acid being preferred, and with zinc diacrylate being most preferred. The unsaturated carboxylic acid metal salt can be blended in the polyalkenamer rubber either as a preformed metal salt, or by introducing an α,β-unsaturated carboxylic acid and a metal oxide or hydroxide into the polyalkenamer rubber composition, and allowing them to react to form the metal salt. The unsaturated carboxylic acid metal salt can be blended in any desired amount, but preferably in amounts of about 10 parts to about 100 parts by weight of the unsaturated carboxylic acid per 100 parts by weight of the polyalkenamer rubber.

3. Peptizer

The polyalkenamer rubber compositions used in the present invention also may incorporate one or more of the so-called "peptizers".

The peptizer preferably comprises an organic sulfur compound and/or its metal or non-metal salt. Examples of such organic sulfur compounds include, without limitation, thiophenols, such as pentachlorothiophenol, 4-butyl-o-thiocresol, 4 t-butyl-p-thiocresol, and 2-benzamidothiophenol; thiocarboxylic acids, such as thiobenzoic acid; 4,4' dithio dimorpholine; and, sulfides, such as dixylyl disulfide, dibenzoyl disulfide; dibenzothiazyl disulfide; di(pentachlorophenyl) disulfide; dibenzamido diphenyldisulfide (DBDD), and alkylated phenol sulfides, such as VULTAC marketed by Atofina Chemicals, Inc. of Philadelphia, Pa. Preferred organic sulfur compounds include pentachlorothiophenol, and dibenzamido diphenyldisulfide.

Examples of the metal salt of an organic sulfur compound include, without limitation, sodium, potassium, lithium, magnesium calcium, barium, cesium and zinc salts of the above-mentioned thiophenols and thiocarboxylic acids, with the zinc salt of pentachlorothiophenol being most preferred.

Examples of the non-metal salt of an organic sulfur compound include, without limitation, ammonium salts of the above-mentioned thiophenols and thiocarboxylic acids wherein the ammonium cation has the general formula $[NR^1R^2R^3R^4]^+$ where $R^1$, $R^2$, $R^3$ and $R^4$ are selected from the group consisting of hydrogen, a $C_1$-$C_{20}$ aliphatic, cycloaliphatic or aromatic moiety, and any and all combinations thereof, with the most preferred being the $NH_4^+$-salt of pentachlorothiophenol.

Examples of the non-salt of an organic sulfur compound include, without limitation, a heteroaryl compound, a heterocycle other than morpholine, an organic sulfur compound comprising at least one heteroatom conjugated to a functional group bearing a sulfur atom, and combinations thereof, which comprise an indole peptizer, a quinoline peptizer, an isoquinoline peptizer, a pyridine peptizer, a purine peptizer, a pyrimidine peptizer, a diazine peptizer, a triazine peptizer, a carbazole peptizer, a halogenated pyridine peptizer, a halogenated pyrimidine peptizer, a halogenated diazine peptizer, a halogenated triazine peptizer, a halogenated thiol peptizer, or combinations of such peptizers.

The peptizer, if employed to manufacture golf balls of the present invention, is present in an amount of from about 0.01 parts to about 10 parts by weight, preferably of from about 0.10 parts to about 7 parts by weight, more preferably of from about 0.15 parts to about 5 parts by weight per 100 parts by weight of the polyalkenamer rubber component.

4. Accelerators

The polyalkenamer rubber composition also can comprise one or more accelerators of one or more classes. Accelerators are added to an unsaturated polymer to increase the vulcanization rate and/or decrease the vulcanization temperature. Accelerators can be of any class known for rubber processing including mercapto-, sulfenamide-, thiuram, dithiocarbamate, dithiocarbamyl-sulfenamide, xanthate, guanidine, amine, thiourea, and dithiophosphate accelerators. Specific commercial accelerators include 2-mercaptobenzothiazole and its metal or non-metal salts, such as Vulkacit Mercapto C, Mercapto MGC, Mercapto ZM-5, and ZM marketed by Bayer AG of Leverkusen, Germany, Nocceler M, Nocceler MZ, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in *The Vanderbilt Rubber Handbook.* 13th Edition (1990, R.T. Vanderbilt Co.), pp. 296-330, in *Encyclopedia of polymer Science and Technology*, Vol. 12 (1970, John Wiley & Sons), pp. 258-259, and in *Rubber Technology Handbook* (1980, Hanser/Gardner Publications), pp. 234-236. Preferred accelerators include 2-mercaptobenzothiazole (MBT) and its salts.

The polyalkenamer rubber composition can further incorporate from about 0.1 part to about 10 parts by weight of the accelerator per 100 parts by weight of the polyalkenamer rubber. More preferably, the ball composition can further incorporate from about 0.2 part to about 5 parts, and most preferably from about 0.5 part to about 1.5 parts, by weight of the accelerator per 100 parts by weight of the polyalkenamer rubber.

C. Synthetic and Natural Rubbers

Traditional rubber components used in golf ball applications can be used to make golf balls according to the present invention including, without limitation, both natural and synthetic rubbers, such as cis-1,4-polybutadienes, trans-1,4-polybutadienes, 1,2-polybutadienes, cis-polyisoprenes, transpolyisoprenes, polychloroprenes, polybutylenes, styrene-butadiene rubbers, styrene-butadiene-styrene block copolymers and partially and fully hydrogenated equivalents, styrene-isoprene-styrene block copolymers and partially and fully hydrogenated equivalents, nitrile rubbers, silicone rubbers, and polyurethanes, as well as mixtures of these materials. Polybutadiene rubbers, especially 1,4-polybutadiene rubbers containing at least 40 mol %, and more preferably 80 to 100 mol % of cis-1,4 bonds, are preferred because of their high rebound resilience, moldability, and high strength after vulcanization. The polybutadiene component may be purchased, if commercially available, or synthesized by methods now known or hereafter developed, including using rare earth-based catalysts, nickel-based catalysts, or cobalt-based catalysts, that conventionally are used in this field. Polybutadiene obtained by using lanthanum rare earth-based catalysts usually employ a combination of a lanthanum rare earth (atomic number of 57 to 71) compound, but particularly preferred is a neodymium compound.

The 1,4-polybutadiene rubbers have a molecular weight distribution (Mw/Mn) of from about 1.2 to about 4.0, preferably from about 1.7 to about 3.7, even more preferably from about 2.0 to about 3.5, and most preferably from about 2.2 to about 3.2. The polybutadiene rubbers have a Mooney viscosity ($ML_{1+4}$ (100° C.)) of from about −10 to about 80, preferably from about 20 to about 70, even more preferably from about 30 to about 60, and most preferably from about 35 to about 50. "Mooney viscosity" refers to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

Examples of 1,2-polybutadienes having differing tacticity, all of which are suitable as unsaturated polymers for use in the present invention, are atactic 1,2-polybutadienes, isotactic 1,2-polybutadienes, and syndiotactic 1,2-polybutadienes. Syndiotactic 1,2-polybutadienes having crystallinity suitable for use as an unsaturated polymer in compositions within the scope of the present invention are polymerized from a 1,2-addition of butadiene. Golf balls within the scope of the present invention include syndiotactic 1,2-polybutadienes having crystallinity and greater than about 70% of 1,2-bonds, more preferably greater than about 80% of 1,2-bonds, and most preferably greater than about 90% of 1,2-bonds. Also, golf balls within the scope of the present invention not only have such crystallinity but also have a mean molecular weight of between from about 10,000 to about 350,000, more preferably between from about 50,000 to about 300,000, more preferably between from about 80,000 to about 200,000, and most preferably between from about 10,000 to about 150,000. Examples of suitable syndiotactic 1,2-polybutadienes having crystallinity suitable for use in golf balls within the scope of the present invention are sold under the trade names RB810, RB820, and RB830 by JSR Corporation of Tokyo, Japan. These have more than 90% of 1,2 bonds, a mean molecular weight of approximately 120,000, and crystallinity between about 15% and about 30%.

D. Thermoplastic Materials

1. Olefinic Thermoplastic Elastomers

Examples of olefinic thermoplastic elastomers include, without limitation, metallocene-catalyzed polyolefins, ethylene-octene copolymers, ethylene-butene copolymers, and ethylene-propylene copolymers all with or without controlled tacticity as well as blends of polyolefins having ethyl-propylene-non-conjugated diene terpolymers, rubber-based copolymers, and dynamically vulcanized rubber-based copolymers. Examples of such polymers that are commercially available include products sold under the trade names SANTOPRENE, DYTRON, VISTAFLEX, and VYRAM by Advanced Elastomeric Systems of Houston, Tex., and SARLINK by DSM of Haarlen, the Netherlands.

2. Co-Polyester Thermoplastic Elastomers

Examples of copolyester thermoplastic elastomers include polyether ester block copolymers, polylactone ester block copolymers, and aliphatic and aromatic dicarboxylic acid copolymerized polyesters. Polyether ester block copolymers are copolymers comprising polyester hard segments polymerized from a dicarboxylic acid and a low molecular weight diol, and polyether soft segments polymerized from an alkylene glycol having 2 to 10 atoms. Polylactone ester block copolymers are copolymers having polylactone chains instead of polyether as the soft segments discussed above for polyether ester block copolymers. Aliphatic and aromatic dicarboxylic copolymerized polyesters are copolymers of an acid component selected from aromatic dicarboxylic acids, such as terephthalic acid and isophthalic acid, and aliphatic acids having 2 to 10 carbon atoms with at least one diol component, selected from aliphatic and alicyclic diols having 2 to 10 carbon atoms. Blends of aromatic polyester and aliphatic polyester also may be used for these. Examples of these include products marketed under the trade names HYTREL by E.I. DuPont de Nemours & Company, and SKYPEL by S.K. Chemicals of Seoul, South Korea.

3. Other Thermoplastic Elastomers

Examples of other thermoplastic elastomers include multi-block, rubber-based copolymers, particularly those in which the rubber block component is based on butadiene, isoprene, or ethylene/butylene. The non-rubber repeating units of the copolymer may be derived from any suitable monomer, including meth(acrylate) esters, such as methyl methacrylate and cyclohexylmethacrylate, and vinyl arylenes, such as styrene. Styrenic block copolymers are copolymers of styrene with butadiene, isoprene, or a mixture of the two. Additional unsaturated monomers may be added to the structure of the styrenic block copolymer as needed for property, modification of the resulting SBC/urethane copolymer. The styrenic block copolymer can be a diblock or a triblock styrenic polymer. Examples of such styrenic block copolymers are described in, for example, U.S. Pat. No. 5,436,295 to Nishikawa et al., which is incorporated herein by reference. The styrenic block copolymer can have any known molecular weight for such polymers, and it can possess a linear, branched, star, dendrimeric or combination molecular structure. The styrenic block copolymer can be unmodified by functional groups, or it can be modified by hydroxyl group, carboxyl group, or other functional groups, either in its chain structure or at one or more terminus. The styrenic block copolymer can be obtained using any common process for manufacture of such polymers. The styrenic block copolymers also may be hydrogenated using well-known methods to obtain a partially or fully saturated diene monomer block. Examples of styrenic copolymers include, without limitation, resins manufactured by Kraton Polymers (formerly of Shell Chemicals) under the trade names KRATON D (for styrene-butadiene-styrene and styrene-isoprene-styrene types), and KRATON G (for styrene-ethylene-butylene-styrene and styrene-ethylene-propylene-styrene types) and Kuraray under the trade name SEPTON. Examples of randomly distributed styrenic polymers include paramethylstyrene-isobutylene (isobutene) copolymers developed by ExxonMobil Chemical Corporation and styrene-butadiene random copolymers developed by Chevron Phillips Chemical Corporation.

Examples of other thermoplastic elastomers suitable as additional polymer components in the present invention include those having functional groups, such as carboxylic acid, maleic anhydride, glycidyl, norbornene, and hydroxyl functionalities. An example of these includes a block polymer having at least one polymer block A comprising an aromatic vinyl compound and at least one polymer block B comprising a conjugated diene compound, and having a hydroxyl group at the terminal block copolymer, or its hydrogenated product. An example of this polymer is sold under the trade name SEPTON HG-252 by Kuraray Company of Kurashiki, Japan. Other examples of these include: maleic anhydride functionalized triblock copolymer consisting of polystyrene end blocks and poly(ethylene/butylene), sold under the trade name KRATON FG 1901X by Shell Chemical Company; maleic anhydride modified ethylene-vinyl acetate copolymer, sold under the trade name FUSABOND by E.I. DuPont de Nemours & Company; ethylene-isobutyl acrylate-methacrylic acid terpolymer, sold under the trade name NUCREL by E.I. DuPont de Nemours & Company; ethylene-ethyl acrylate-methacrylic anhydride terpolymer, sold under the trade name BONDINE AX 8390 and 8060 by Sumitomo Chemical Industries; brominated styrene-isobutylene copolymers sold under the trade name BROMO XP-50 by Exxon Mobil Corporation; and resins having glycidyl or maleic anhydride functional groups sold under the trade name LOTADER by Elf Atochem of Puteaux, France.

4. Polyamides

Examples of polyamides within the scope of the present invention include resins obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as $\epsilon$-caprolactam or $\omega$-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine, and any combination of those Specific examples of suitable polyamides include polyamide 6; polyamide 11; polyamide 12; polyamide 4,6; polyamide 6,6; polyamide 6,9; polyamide 6,10; polyamide 6,12; PA12CX; PA12, IT; PPA; PA6, IT.

Non-limiting examples of suitable polyamides or copolymeric polyamides for use in the inner mantle and/or the outer mantle layer include those sold under the trademarks PEBAX, CRISTAMID and RILSAN marketed by ATOFINA Chemicals of Philadelphia, Pa.; GRILAMID marketed by EMS CHEMIE of Sumter, S.C.; TROGAMID marketed by Degusssa of Dusseldorf, Germany; and ZYTEL marketed by E.I. DuPont de Nemours & Co. of Wilmington, Del.

5. Polyamide Elastomer

Examples of polyamide elastomers within the scope of the present invention include polyether amide elastomers, which result from the copolycondensation of polyamide blocks having reactive chain ends with polyether blocks having reactive chain ends, including: 1) polyamide blocks of diamine chain ends with polyoxyalkylene sequences of dicarboxylic chain ends; 2) polyamide blocks of dicarboxylic chain ends with polyoxyalkylene sequences of diamine chain ends obtained by cyanoethylation and hydrogenation of polyoxyalkylene alpha-omega dihydroxylated aliphatic sequences known as polyether diols; and 3) polyamide blocks of dicarboxylic chain ends with polyether diols, the products obtained, in this particular case, being polyetheresteramides.

The polyamide blocks of dicarboxylic chain ends come, for example, from the condensation of alpha-omega aminocarboxylic acids of lactam or of carboxylic diacids and diamines in the presence of a carboxylic diacid which limits the chain length. The molecular weight of the polyamide sequences preferably is between about 300 and about 15,000, and more preferably between about 600 and about 5,000. The molecular weight of the polyether sequences preferably is between about 100 and about 6,000, and more preferably between about 200 and about 3,000.

The amide block polyethers also may comprise randomly distributed units. These polymers may be prepared by the simultaneous reaction of polyether and precursor of polyamide blocks.

For example, the polyether diol may react with a lactam (or alpha-omega amino acid) and a diacid which limits the chain in the presence of water. A polymer is obtained having mainly polyether blocks, polyamide blocks of very variable length, but also the various reactive groups having reacted in a random manner and which are distributed statistically along the polymer chain.

Suitable amide block polyethers include, without limitation, those disclosed in U.S. Pat. Nos. 4,331,786, 4,115,475, 4,195,015, 4,839,441, 4,864,014, 4,230,838, and 4,332,920, which are incorporated herein in their entireties by reference. The polyether may be, for example, a polyethylene glycol (PEG), a polypropylene glycol (PPG), or a polytetramethylene glycol (PTMG), also designated as polytetrahydrofurane (PTHF).

The polyether blocks may be along the polymer chain in the form of diols or diamines. However, for reasons of simplification, they are designated PEG blocks, or PPG blocks, or also PTMG blocks.

It is also within the scope of the disclosed embodiments that the polyether block comprises different units such as units, which derive from ethylene glycol, propylene glycol, or tetramethylene glycol.

The amide block polyether comprises at least one type of polyamide block and one type of polyether block. Mixing two or more polymers with polyamide blocks and polyether blocks also may be used. It also can comprise any amide structure made from the method described on the above.

Preferably, the amide block polyether is such that it represents the major component in weight, i.e., that the amount of polyamide which is under the block configuration and that which is eventually distributed statistically in the chain represents 50 weight percent or more of the amide block polyether. Advantageously, the amount of polyamide and the amount of polyether is in a ratio (polyamide/polyether) of about 1:1 to about 3:1.

One type of polyetherester elastomer is the family of Pebax, which are available from Elf-Atochem Company. Preferably, the choice can be made from among Pebax 2533, 3533, 4033, 1205, 7033, and 7233. Blends or combinations of Pebax 2533, 3533, 4033, 1205, 7033, and 7233 also can be prepared, as well. Pebax 2533 has a hardness of about 25 shore D (according to ASTM D-2240), a Flexural Modulus of about 2.1 kpsi (according to ASTM D-790), and a Bayshore resilience of about 62% (according to ASTM D-2632). Pebax 3533 has a hardness of about 35 shore D (according to ASTM D-2240), a Flexural Modulus of about 2.8 kpsi (according to ASTM D-790), and a Bayshore resilience of about 59% (according to ASTM D-2632). Pebax 7033 has a hardness of about 69 shore D (according to ASTM D-2240) and a Flexural Modulus of about 67 kpsi (according to ASTM D-790). Pebax 7333 has a hardness of about 72 shore D (according to ASTM D-2240) and a Flexural Modulus of about 107 kpsi (according to ASTM D-790).

6. Ethylenically Unsaturated Thermoplastic Elastomers

Another family of thermoplastic elastomers for use in the golf balls of the present invention are polymers of (i) ethylene and/or an alpha olefin; and (ii) an $\alpha,\beta$-ethylenically unsaturated $C_3$-$C_{20}$ carboxylic acid or anhydride, or an $\alpha,\beta$-ethylenically unsaturated $C_3$-$C_{20}$ sulfonic acid or anhydride or an $\alpha,\beta$-ethylenically unsaturated $C_3$-$C_{20}$ phosphoric acid or anhydride and, optionally iii) a $C_1$-$C_{10}$ ester of an $\alpha,\beta$-ethylenically unsaturated $C_3$-$C_{20}$ carboxylic acid or a $C_1$-$C_{10}$ ester of an $\alpha,\beta$-ethylenically unsaturated $C_3$-$C_{20}$ sulfonic acid or a $C_1$-$C_{10}$ ester of an $\alpha,\beta$-ethylenically unsaturated $C_3$-$C_{20}$ phosphoric acid.

Preferably, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid and methacrylic acid being preferred. Preferably, the carboxylic acid ester of if present may be selected from the group consisting of vinyl esters of aliphatic carboxylic acids wherein the acids have 2 to 10 carbon atoms and vinyl ethers wherein the alkyl groups contain 1 to 10 carbon atoms.

Examples of such polymers suitable for use include, but are not limited to, an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, and the like.

Most preferred are ethylene/(meth)acrylic acid copolymers and ethylene/(meth)acrylic acid/alkyl (meth)acrylate terpolymers, or ethylene and/or propylene maleic anhydride copolymers and terpolymers.

The acid content of the polymer may contain anywhere from 1 to 30 percent by weight acid. In some instances, it is preferable to utilize a high acid copolymer (i.e., a copolymer containing greater than 16% by weight acid, preferably from about 17 to about 25 weight percent acid, and more preferably about 20 weight percent acid).

Examples of such polymers which are commercially available include, but are not limited to, the Escort 5000, 5001, 5020, 5050, 5070, 5100, 5110 and 5200 series of ethylene-acrylic acid copolymers sold by Exxon and the PRIMACOR® 1321, 1410, 1410-XT, 1420, 1430, 2912, 3150, 3330, 3340, 3440, 3460, 4311 and 4608 series of ethylene-acrylic acid copolymers sold by The Dow Chemical Company, Midland, Mich.

Also included are the bimodal ethylene/carboxylic acid polymers as described in U.S. Pat. No. 6,562,906, the entire contents of which are herein incorporated by reference. These polymers comprise ethylene/$\alpha,\beta$-ethylenically unsaturated $C_{3-8}$ carboxylic acid high copolymers, particularly ethylene (meth)acrylic acid copolymers and ethylene, alkyl (meth)acrylate, (meth)acrylic acid terpolymers, having molecular weights of about 80,000 to about 500,000 which are melt blended with ethylene/$\alpha,\beta$-ethylenically unsaturated $C_{3-8}$ carboxylic acid copolymers, particularly ethylene/(meth) acrylic acid copolymers having molecular weights of about 2,000 to about 30,000.

7. Ionomers

The core, cover layer and, optionally, one or more inner cover layers golf ball embodiments of the present invention may further comprise one or more ionomer resins. One family of such resins was developed in the mid-1960's, by E.I. DuPont de Nemours and Co., and sold under the trademark SURLYN®. Preparation of such ionomers is well known, for example see U.S. Pat. No. 3,264,272 (the entire contents of which are herein incorporated by reference). Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester also may be incorporated in the formulation as a so-called "softening comonomer". The incorporated carboxylic acid groups are then neutralized, either partially of fully, to form the ionomer. Suitable bases for partial or total neutralization of the acid functional group include all compounds sufficiently basic to deprotonate the acid functional group, including but not limited to, metal oxides, metal hydroxides, metal carbonates, metal bicarbonates and metal acetates. The metal ions may include, but are not limited to, Group IA, IB, IIA, IIB, IIIA, IIIB, IVA, IVB, VA, VB, VIIA, VIIB, VIIB and VIIIB metal ions, or combinations thereof, typically Group Ia, Group IIa or Group IIb metal ions. Preferred metal ions of such compounds include lithium ($Li^+$), sodium ($Na^+$), potassium ($K^+$), magnesium ($Mg^{2+}$), zinc ($Zn^{2+}$), cesium ($Cs^+$), rubidium ($Rb^+$), calcium ($Ca^{2+}$), barium ($Ba^{2+}$), manganese ($Mn^{2+}$), strontium ($Sr^{2+}$), aluminum ($Al^{2+}$ or $^{3+}$), tungsten ($W^{4+}$ or $^{6+}$) zirconium ($Zr^{4+}$), titanium ($Ti^{4+}$) and hafnium ($Hf^{4+}$), and most typically a Group I metal ion, such as sodium or lithium. Alternatively, the counterion might be a positively charged organic species, such as an ammonium or substituted ammonium cation.

The first commercially available ionomer resins contained up to 16 weight percent acrylic or methacrylic acid, although it also was well known at that time that, as a general rule, the hardness of these cover materials could be increased with increasing acid content. Hence, in Research Disclosure 29703, published in January 1989, DuPont disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high acid ionomers are typically defined as those ionomer resins with acrylic or methacrylic acid units present from 16 weight percent to about 35 weight percent in the polymer. Generally, such a high acid ionomer will have a flexural modulus from about 50,000 psi to about 125,000 psi.

Ionomer resins may further comprise a softening comonomer, present from about 10 weight percent to about 50 weight percent in the polymer, have a flexural modulus from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate and methyl methacrylate.

Today, there are a wide variety of commercially available ionomer resins based both on copolymers of ethylene and (meth)acrylic acid or terpolymers of ethylene and (meth) acrylic acid and (meth)acrylate, many of which can be used as a golf ball component. The properties of these ionomer resins can vary widely due to variations in acid content, softening comonomer content, the degree of neutralization, and the type of metal ion used in the neutralization. The full range commercially available typically includes ionomers of polymers of general formula, E/X/Y, wherein E is ethylene, X is a $C_3$ to $C_8$ $\alpha,\beta$-ethylenically unsaturated carboxylic acid, such as acrylic or methacrylic acid, and is present in an amount from about 2 to about 30 weight percent of the E/X/Y copolymer, and Y is a softening comonomer selected from the group consisting of alkyl acrylate and alkyl methacrylate, such as methyl acrylate or methyl methacrylate, and wherein the alkyl groups have from 1-8 carbon atoms, Y is in the range of 0 to about 50 weight percent of the E/X/Y copolymer, and wherein the acid moiety is neutralized from about 1% to about 90% to form an ionomer with a cation such as lithium, sodium, potassium, magnesium, calcium, barium, lead, tin, zinc or aluminum, or a combination of such cations.

The ionomer also may be a so-called bimodal ionomer as described in U.S. Pat. No. 6,562,906 (the entire contents of which are herein incorporated by reference). These ionomers are bimodal as they are prepared from blends comprising polymers of different molecular weights. Specifically they include bimodal polymer blend compositions comprising:

a high molecular weight component having molecular weight of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; the high molecular weight component being partially neutralized with metal ions selected from the group consisting of lithium, sodium, potassium, zinc, calcium, magnesium, and a mixture of any these; and a low molecular weight component having a molecular weight of from about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; the low molecular weight component being partially neutralized with metal ions selected from the group consisting of lithium, sodium, potassium, zinc, calcium, magnesium, and a mixture of any these.

In addition to the unimodal and bimodal ionomers, also included are the so-called "modified ionomers" examples of which are described in U.S. Pat. Nos. 6,100,321, 6,329,458 and 6,616,552 and U.S. Patent Publication US 2003/0158312 A1, the entire contents of all of which are herein incorporated by reference.

The modified unimodal ionomers are prepared by mixing:

an ionomeric polymer comprising ethylene, from 5 to 25 weight percent (meth)acrylic acid, and from 0 to 40 weight percent of a (meth)acrylate monomer, the ionomeric polymer neutralized with metal ions selected from the group consisting of lithium, sodium, potassium, zinc, calcium, magnesium, and a mixture of any these, and from about 5 to about 40 weight percent (based on the total weight of said modified ionomeric polymer) of one or more fatty acids or metal salts of said fatty acid, the metal selected from the group consisting of calcium, sodium, zinc, potassium, and lithium, barium and magnesium and the fatty acid preferably being stearic acid.

The modified bimodal ionomers, which are ionomers derived from the earlier described bimodal ethylene/carboxylic acid polymers (as described in U.S. Pat. No. 6,562,906, the entire contents of which are herein incorporated by reference), are prepared by mixing:

a. a high molecular weight component having molecular weight of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; the high molecular weight component being partially neutralized with metal ions selected from the group consisting of lithium, sodium, zinc, calcium, potassium, magnesium, and a mixture of any of these;

b. a low molecular weight component having a molecular weight of about from about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; the low molecular weight component being partially neutralized with metal ions selected from the group consisting of lithium, sodium, zinc, calcium, potassium, magnesium, and a mixture of any of these; and c. from about 5 to about 40 weight percent (based on the total weight of said modified ionomeric polymer) of one or more fatty acids or metal salts of the fatty acid, the metal selected from the group consisting of calcium, sodium, zinc, potassium and lithium, barium and magnesium and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The generic formula for all fatty and waxy acids above acetic acid is $CH_3(CH_2)_xCOOH$, wherein the carbon atom count includes the carboxyl group. The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to, stearic acid ($C_{18}$, i.e., $CH_3$ $(CH_2)_{16}$ COOH), palmitic acid ($C_{16}$, i.e., $CH_3$ $(CH_2)_{14}COOH$), pelargonic acid ($C_9$, i.e., $CH_3$ $(CH_2)_7$ COOH) and lauric acid ($C_{12}$, i.e., $CH_3$ $(CH_2)_{10}OCOOH$). Examples of suitable unsaturated fatty acids, i.e., a fatty acid in which there are one or more double bonds between the carbon atoms in the alkyl chain, include but are not limited to oleic acid ($C_{18}$, i.e., $CH_3(CH_2)_7CH:CH(CH_2)_7COOH$).

The source of the metal ions used to produce the metal salts of the fatty or waxy acid salts used in the various modified ionomers are generally various metal salts, which provide the metal ions capable of neutralizing, to various extents, the carboxylic acid groups of the fatty acids. These include the sulfate, carbonate, acetate and hydroxylate salts of zinc, sodium, lithium, potassium, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of the fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion.

An example of such a modified ionomer polymer is DuPont® HPF-1000 available from E. I. DuPont de Nemours and Co. Inc.

The polymer blend compositions are prepared by blending together a) at least one component A that is a monomer, oligomer, prepolymer, or polymer comprising at least 5% by weight of anionic functional groups selected from the group consisting of sulfonic acid, phosphoric acid, and carboxylic acid; b) at least one component B that is a triblock copolymer comprising less by weight of anionic functional groups than the weight percentage of anionic functional groups of the at least one component A, the triblock copolymer having: (i) a first polymer block comprising an aromatic vinyl compound; (ii) a second polymer block comprising a diene compound; and (iii) a hydroxyl group located at a block copolymer; or a hydrogenation product of the triblock copolymer, or mixtures thereof; and c) at least one component C that is a metal cation, to form a first composition, and melt-processing the first composition to produce a reaction product of the anionic functional groups of the at least one component A and the at least one component C to form the polymer blend composition.

VII. Processing Polymeric Materials to Form Sports Equipment

Disclosed embodiments of the present invention particularly concern a method for making a golf ball where at least one layer of the ball comprises a polymeric composition, most typically a polyurethane or urethane prepolymer composition, modified as disclosed herein. The composition can be prepared for processing, such as mixing plural components in effective ratios, by any suitable process, such as single screw extrusion, twin-screw extrusion, banbury mixing, two-roll mill mixing, dry blending, by using a master batch, or any combination of these techniques.

The layers may be made by any suitable process, including extrusion, such as is disclosed in assignee's copending application Ser. No. 11/486,938, filed Jul. 13, 2006, which is incorporated herein by reference, compression molding, injection molding, reaction injection molding, coating, casting, dipping, or combinations thereof. Additional examples of methods for processing disclosed compositions include injection molding, reaction injection molding (RIM) injection-blow molding, blow molding, transfer molding, thermoforming, liquid- or powder spraying, liquid- or powder-dipping, and any and all combinations thereof.

Golf balls can be formed using disclosed compositions using any of a variety of methods. For example, the compositions can be injected molded to form ball half cups, and these half cups can be compression molded to form a spherical golf ball having dimples. For reaction injection molding, components of the reaction mixture can be metered to the mold from different holding tanks at suitable ratios. Alternatively, at least a portion or layer of a golf ball can be formed by injection molding in combination with some other technique.

The following patents, patent publications, and applications are incorporated herein by reference: U.S. Pat. No. 6,042,489; U.S. Pat. No. 6,183,382; U.S. Pat. No. 6,426,387; U.S. Pat. No. 6,508,725; U.S. Pat. No. 6,776,942; U.S. Pat. No. 6,861,474; U.S. Pat. No. 6,878,075; U.S. Pat. No. 6,924,337; U.S. Pat. No. 6,930,150; U.S. Pat. No. 7,001,286; U.S. Pat. No. 7,026,399; U.S. Pat. No. 7,037,985; U.S. Pat. No. 7,163,471; U.S. Pat. No. 7,169,861; U.S. Publication No. 2003/0224871; U.S. Publication No. 2004/0092336; U.S. Publication No. 2005/0059756; U.S. Publication No. 2006/0014898; Polyalkenamer Compositions and Golf Balls Prepared Therefrom; application Ser. No. 11/335,070, filed Jan. 18, 2006; Extrusion Method for Making Golf Balls, application Ser. No. 11/486,938, filed Jul. 13, 2006; Amide-Modified Polymer Compositions and Sports Equipment Made Using the Compositions, application Ser. No. 11/592,109, filed Nov. 1, 2006; Polymer Compositions Comprising Peptizers, Sports Equipment Comprising Such Compositions, and Method for their Manufacture, application Ser. No. 11/639,871, filed Dec. 15, 2006; Golf Balls with Improved Feel, Provisional Application No. 60/878,024, filed Dec. 29, 2006; Method for Making Ionomers Using Amine Compounds Comprising Salt Functional Groups, Ionomers Made by the Method and Sports Equipment Comprising Such Ionomers, application Ser. No. 11/685,335, filed Mar. 13, 2007; Propylene Elastomer Compositions and Golf Balls That Include Such Compositions, application Ser. No. 11/784,860, filed Apr. 9, 2007; and Polymer Compositions and Golf Balls with Reduced Yellowing, application Ser. No. 11/809,432, filed May 31, 2007.

VIII. Examples

The following examples are provided to exemplify certain features of working or prophetic embodiments. The scope of the present invention should be limited to the particular features disclosed in these examples.

Example 1

This example concerns the formation of a polyurea polymer incorporating a salt of glutamine. For comparison, a polyurea polymer without glutamine was prepared.

The polyurea polymer was prepared by curing Adiprene LF950A (a toluene diisocyanate (TDI) terminated polytetramethylene ether glycol (PTMEG) based prepolymer having 5.9-6.2 wt % NCO, Chemtura) with diethyltoluenediamine (DETDA) at 100 equivalents relative to the NCO content of the LF950A.

The sodium salt of glutamine was obtained from the mixture of L-glutamine, water, and sodium hydroxide. The sodium salt of L-glutamine was mixed with DETDA at a ratio of about 1:3, and then LF950A was added to the mixture to give PTMEG-glutamine polyurea. Material properties were measured and are summarized in the table. The flexural modulus and flexural stress were measured using the method described in ASTM D-790. Material Shore D hardness was measured on a plaque using the method described in ASTM D-2240.

|  | Composition | PTMEG Polyurea | PTMEG-glutamine Polyurea |
|---|---|---|---|
| Prepolymer | LF950A | x | x |
| Curative | DETDA | 100 equivalent | 75 equivalent |
|  | Na salt of L-glutamine | 0 | 25 equivalent |
| Gel time | 145° F. | 52 sec | 57 sec |
| Properties | Flexural modulus (kpsi) | 14.82 | 13.29 |
|  | Flexural stress (kpsi) | 117.7 | 105.4 |
|  | Hardness (Shore D) | 46 | 45.8 |

The data demonstrated that a portion of the DETDA could be replaced with the sodium salt of L-glutamine. Adding the sodium salt of L-glutamine introduced an ionic salt into the polymer structure while maintaining other mechanical properties. In addition, the gel time of the PTMEG-glutamine polyurea was longer than the PTMEG polyurea gel time, thus providing more flexibility in varying material composition, and hence material properties and processability.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A golf ball having at least one component comprising a composition comprising:
    a first component, comprising at least one polyurethane, polyurea, polyurethane precursor composition, polyurea precursor composition, blocked polyurethane, blocked polyurea, blocked polyurethane precursor composition, or blocked polyurea precursor composition, the first component further comprising a chitin or a chitin derivative; and
    a second component, comprising an effective amount of a polyfunctional modifier having at least a first functional group comprising a pendent acid functional group, a heterocyclic functional group, or precursor thereof, and at least a second pendent functional group selected from amine functional groups, amine equivalent functional groups, hydroxyl functional groups, hydroxyl equivalent functional groups, and combinations thereof.

2. The golf ball according to claim 1 comprising an effective amount of a polyfunctional modifier having at least a first functional group comprising a pendent acid functional group and at least a second pendent functional group selected from amine functional groups, functional groups that can be chemically or thermally converted into amine functional groups, hydroxyl functional groups, functional groups that can be chemically or thermally converted into hydroxyl functional groups, and any and all combinations thereof.

3. The golf ball according to claim 1 comprising an effective amount of a polyfunctional modifier having at least two different functional groups, comprising at least a first and second functional group independently selected from amine functional groups, functional groups that can be chemically or thermally converted into amine functional groups, hydroxyl functional groups, functional groups that can be chemically or thermally converted into hydroxyl functional groups, and any and all combinations thereof, and at least a third pendent functional group comprising a pendent acid or heterocyclic functional group.

4. The golf ball according to claim 2 where the polyfunctional modifier has a formula $(X)_m$-(linker)$_n$-$(RY)_o$-(linker)$_p$-$(X)_q$, where m is 1 or greater, n is 0 or greater, o is 1 or greater, p is 0 or greater, q is 0 or greater, X is selected from amine functional groups, functional groups that convert into amine functional groups when processed to produce sports equipment, functional groups that can be chemically converted into amine functional groups, hydroxyl functional groups, functional groups that convert to hydroxyl functional groups when processed to produce sports equipment, functional groups that be chemically converted into hydroxyl functional groups, and any and all combinations thereof, the linker is aliphatic, cyclic aliphatic or aromatic, Y is a carboxylic acid functional group or a sulfonic acid functional group, and R is a heteroatom, aliphatic, cyclic aliphatic or aromatic and bonded directly to the linkers and Y.

5. The golf ball according to claim 2 where the polyfunctional modifier has a formula

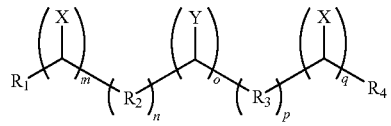

where m is 1 or greater, n is 0 or greater, o is 1 or greater, p is 0 or greater, q is 0 or greater, $R_1$ and $R_4$ independently are selected from hydrogen, aliphatic, cyclic aliphatic, and aromatic, and $R_2$ and $R_3$ independently are selected from aliphatic, cyclic aliphatic, and aromatic, X is selected from amine functional groups, functional groups that convert into amine functional groups when processed to produce sports equipment, functional groups that can be chemically converted into amine functional groups, hydroxyl functional groups, functional groups that convert to hydroxyl functional groups when processed to produce sports equipment, functional groups that be chemically converted into hydroxyl functional groups, and any and all combinations thereof, and Y is an acid functional group.

6. The golf ball according to claim 5 comprising a thermoplastic polyurethane or urethane prepolymer composition and an effective amount of the polyfunctional modifier having at least one amine functional group, or at least one hydroxyl functional group.

7. The golf ball according to claim 1 further comprising a cross-linking agent selected from sulfur compounds, peroxides, azides, and maleimides; a co-cross-linking agent; a base resin; a peptizer; an accelerator; a photostabilizer; a co-initiator; an antioxidant; a colorant; a dispersant; a mold release agent; a processing aid; a fiber; a filler; and any and all combinations thereof.

8. The golf ball according to claim 1 further comprising at least one additional polymeric material selected from synthetic and natural rubbers, thermoplastic elastomers, metallocene catalyzed polymer, polyolefins, halogenated polyolefins, halogenated polyethylene, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, bimodal ionomers, modified bimodal ionomers, thermoplastic polyurethanes, polyurethane ionomers, polyalkenamers, thermoplastic polyureas, polyamides, copolyamides, polyesters, copolyesters, polycarbonates, polyphenylene oxides, polyphenylene sulfides, diallyl phthalate polymers, polyimides, polyvinyl chlorides, polyamide-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic copolymers, functionalized styrenic copolymers, functionalized styrenic terpolymers, styrenic terpolymers, ethylene-propylene copolymer (EPDM), cellulosic polymers, liquid crystal polymers (LCP), ethylene-vinyl acetate copolymers (EVA), polyureas, and polysiloxanes and any and all combinations thereof.

9. The golf ball according to claim 1 where the chitin or chitin derivative comprises at least one poly(D-glucosamine) composition.

10. The golf ball according to claim 1 where the at least one polyurethane, polyurea, polyurethane precursor, polyurea precursor, blocked polyurethane, blocked polyurea, blocked polyurethane precursor, or blocked polyurea precursor comprises a polyurethane formed by the reaction of poly(D-glucosamine) with a material having a diisocyanate or polyisocyanate group or groups.

11. The golf ball according to claim 3 where the polyfunctional modifier has plural acid functional groups selected from carboxylic acid groups, sulfonic acid groups, and combinations thereof.

12. The golf ball according to claim 3 where the polyfunctional modifier has a formula $(X)_m$-(linker)$_n$-$(RY)_o$-(linker)$_p$-$(Z)_q$ where m is 1 or greater, n is 0 or greater, o is 1 or greater, p is 0 or greater, q is 1 or greater, X and Z independently are selected from amine functional groups, functional groups that can be chemically or thermally converted into amine functional groups, hydroxyl functional groups, functional groups that can be chemically or thermally converted into hydroxyl functional groups, and any and all combinations thereof, the linkers are aliphatic, cyclic aliphatic, aromatic, or combinations thereof, Y is coupled to the compound and not bonded to either linker directly, selected from an acid functional group, a functional group that can be chemically or thermally converted into an acid functional group or a heterocyclic functional group, and R is a heteroatom, aliphatic, cyclic aliphatic or aromatic and bonded directly to the linkers and Y.

13. The golf ball according to claim 12 where Y comprises a carboxylic acid, a sulfonic acid, a maleimide, an epoxide or an episulfide.

14. The golf ball according to claim 3 where the polyfunctional modifier has a formula

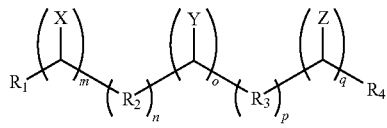

where m is 1 or greater, n is 0 or greater, o is 1 or greater, p is 0 or greater, q is 1 or greater, $R_1$ and $R_4$ independently are selected from hydrogen, aliphatic, cyclic aliphatic, and aromatic, $R_2$ and $R_3$ independently are selected from aliphatic, cyclic aliphatic, and aromatic, X and Z independently are selected from amine functional groups, functional groups that can be chemically or thermally converted into amine functional groups, hydroxyl functional groups, functional groups that can be chemically or thermally converted into hydroxyl functional groups, and any and all combinations thereof, and Y is selected from an acid functional group, a functional group that can be chemically or thermally converted into an acid functional group or a heterocyclic functional group.

15. The golf ball according to claim 14 comprising a thermoplastic polyurethane, polyurea, urethane prepolymer, or blocked urethane prepolymer composition and an effective amount of a polyfunctional modifier having at least one amine functional group and/or at least one hydroxyl functional group or a functional group that can be chemically or thermally converted into a hydroxyl functional group.

16. The golf ball according to claim 1 further comprising from about 1 to about 99 weight percent of an additional thermoplastic or thermoset polymeric material, where the additional thermoplastic or thermoset polymeric material is a polyamide, an ionomer, a polyalkenamer or combinations thereof.

17. The golf ball according to claim 1 having a core, one or more intermediate layers and a cover layer, the one or more intermediate layers comprising the first component, comprising at least one polyurethane, polyurea, polyurethane precursor composition or polyurea precursor composition, the first component further comprising a chitin or a chitin derivative, and the second component, comprising an effective amount of the polyfunctional modifier.

18. A three-piece golf ball according to claim 1, comprising:
a rubber-based core; and
at least one intermediate layer and an outer cover layer, at least one of the intermediate layer and outer cover layer comprising the composition comprising the first component, comprising at least one polyurethane, polyurea, of polyurethane precursor composition or polyurea precursor composition, the first component further comprising a chitin or a chitin derivative, and the second component, comprising an effective amount of the polyfunctional modifier polymer.

19. A four-piece golf ball according to claim 1, comprising:
a rubber-based core having a center; and
an inner intermediate layer, an outer intermediate layer, and a cover, at least one of the inner intermediate layer, outer intermediate layer or cover comprising the composition comprising the first component, comprising at least one polyurethane, polyurea, polyurethane precursor composition or polyurea precursor composition, the first component further comprising a chitin or a chitin derivative, and the second component, comprising an effective amount of the polyfunctional modifier polymer.

20. A method for forming a golf ball, comprising:
providing a composition comprising
a first component, comprising at least one polyurethane, polyurea, polyurethane precursor composition, polyurea precursor composition, blocked polyurethane, blocked polyurea, blocked polyurethane precursor composition, or blocked polyurea precursor composition, the first component further comprising a chitin or a chitin derivative;
a second component, comprising an effective amount of a polyfunctional modifier having at least a first functional group comprising a pendent acid functional group, a heterocyclic compound, or precursor thereof, and at least a second pendent functional group selected from amine functional groups, amine equivalent functional groups, hydroxyl functional groups, hydroxyl equivalent functional groups, and combinations thereof; and
forming at least one component of a golf ball comprising the composition.

21. The method according to claim 20 where the composition comprises an effective amount of a polyfunctional modifier having a formula $(X)_m$-(linker)$_n$-$(Y)_o$-(linker)$_p$-$(X)_q$, where m is 1 or greater, n is 0 or greater, o is 1 or greater, p is 0 or greater, q is 0 or greater, X is selected from amine functional groups, functional groups that convert into amine functional groups when processed to produce sports equipment, functional groups that can be chemically converted into amine functional groups, hydroxyl functional groups, functional groups that convert to hydroxyl functional groups when processed to produce sports equipment, functional groups that be chemically converted into hydroxyl functional groups, and any and all combinations thereof, the linker is aliphatic, Y is a carboxylic acid functional group or a sulfonic acid functional group, and R is a carbon atom, a heteroatom, aliphatic, cyclic aliphatic or aromatic and bonded directly to the linkers and Y.

22. The method according to claim 20 where the composition comprises an effective amount of a polyfunctional modifier having a formula

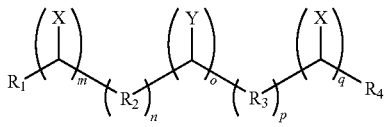

where m is 1 or greater, n is 0 or greater, o is 1 or greater, p is 0 or greater, q is 0 or greater, $R_1$ and $R_4$ independently are selected from hydrogen, aliphatic, cyclic aliphatic, and aromatic, and $R_2$ and $R_3$ independently are selected from aliphatic, cyclic aliphatic, and aromatic, X is selected from amine functional groups, functional groups that convert into amine functional groups when processed to produce sports equipment, functional groups that can be chemically converted into amine functional groups, hydroxyl functional groups, functional groups that convert to hydroxyl functional groups when processed to produce sports equipment, functional groups that be chemically converted into hydroxyl functional groups, and any and all combinations thereof, and Y is a carboxylic acid functional group or a sulfonic acid functional group.

23. The method according to claim 20 where the composition comprises an effective amount of a polyfunctional modifier having a formula $(X)_m$-(linker)$_n$-$(RY)_o$-(linker)$_p$-$(Z)_q$ where m is 1 or greater, n is 0 or greater, o is 1 or greater, p is 0 or greater, q is 1 or greater, X and Z independently are selected from amine functional groups, functional groups that can be chemically or thermally converted into amine functional groups, hydroxyl functional groups, functional groups that can be chemically or thermally converted into hydroxyl functional groups, and any and all combinations thereof, the linkers are aliphatic, cyclic aliphatic, aromatic or combinations thereof, Y is coupled to the compound and not bonded to either linker directly, selected from an acid functional group, a functional group that can be chemically or thermally converted into an acid functional group or a heterocyclic functional group, and R is a carbon atom, a heteroatom, aliphatic, cyclic aliphatic or aromatic and bonded directly to the linkers and Y.

24. The method according to claim 20 where the composition comprises an effective amount of a polyfunctional modifier having a formula

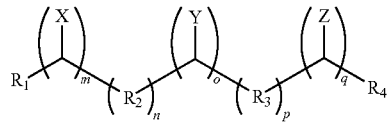

where m is 1 or greater, n is 0 or greater, o is 1 or greater, p is 0 or greater, q is 1 or greater, $R_1$ and $R_4$ independently are selected from hydrogen, aliphatic, cyclic aliphatic, and aromatic, $R_2$ and $R_3$ independently are selected from aliphatic, cyclic aliphatic, and aromatic, X and Z independently are selected from amine functional groups, functional groups that can be chemically or thermally converted into amine functional groups, hydroxyl functional groups, functional groups that can be chemically or thermally converted into hydroxyl functional groups, and any and all combinations thereof, and Y is selected from an acid functional group, a functional group that can be chemically or thermally converted into an acid functional group or a heterocyclic functional group.

* * * * *